United States Patent
Lee et al.

(10) Patent No.: US 11,872,541 B2
(45) Date of Patent: Jan. 16, 2024

(54) METHOD FOR IMPROVING RESISTANCE TO SULFUR-POISONING THROUGH STRUCTURAL TRANSFORMATION OF NANO-CERIA SUPPORTED ON ALUMINA

(71) Applicants: Hyundai Motor Company, Seoul (KR); Kia Corporation, Seoul (KR); Korea Advanced Institute of Science and Technology, Daejeon (KR)

(72) Inventors: Hyunjoo Lee, Daejeon (KR); Beom-Sik Kim, Daejeon (KR); Yoon Sang Nam, Gunpo-si (KR)

(73) Assignees: Hyundai Motor Company, Seoul (KR); Kia Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 17/887,142

(22) Filed: Aug. 12, 2022

(65) Prior Publication Data

US 2023/0072800 A1    Mar. 9, 2023

(30) Foreign Application Priority Data

Aug. 13, 2021 (KR) .................. 10-2021-0107628

(51) Int. Cl.
*B01J 21/04*    (2006.01)
*B01J 23/10*    (2006.01)
(Continued)

(52) U.S. Cl.
CPC ............ *B01J 23/10* (2013.01); *B01D 53/945* (2013.01); *B01J 20/28007* (2013.01);
(Continued)

(58) Field of Classification Search
CPC ...... B01J 20/28007; B01J 21/04; B01J 23/10; B01J 20/28059; B01D 53/945; B82Y 30/00
(Continued)

(56) References Cited

U.S. PATENT DOCUMENTS 3,993,572 A * 11/1976 Hindin ................. B01D 53/944
502/302
9,138,725 B2 * 9/2015 Hoke ....................... B01J 23/63
(Continued)

FOREIGN PATENT DOCUMENTS

KR    20210037799 A    4/2021

OTHER PUBLICATIONS

Jeong, H., et al., "Highly durable metal ensemble catalysts with full dispersion for automotive applications beyond single-atom catalysts," Nature Catalysis, vol. 3, Apr. 2020, 8 pages.
(Continued)

*Primary Examiner* — Cam N. Nguyen
(74) *Attorney, Agent, or Firm* — Slater Matsil, LLP

(57) ABSTRACT

An embodiment ceria-alumina support ($CeO_2$—$Al_2O_3$ support) includes a nano-ceria having a shape of a polygonal bipyramid or a truncated polygonal bipyramid supported on alumina. An embodiment noble metal catalyst for treating exhaust gas includes a noble metal deposited on a ceria-alumina support ($CeO_2$—$Al_2O_3$ support) that includes a nano-ceria having a shape of a polygonal bipyramid or a truncated polygonal bipyramid supported on alumina. An embodiment method for affecting resistance to sulfur-poisoning of a noble metal catalyst through structural transformation of nano-ceria supported on alumina includes performing a hydrothermal treatment of ceria supported on γ-alumina.

23 Claims, 23 Drawing Sheets

(51) Int. Cl.
  *B01J 23/63*   (2006.01)
  *B01J 20/28*   (2006.01)
  *B01D 53/94*   (2006.01)
  *B82Y 30/00*   (2011.01)
(52) U.S. Cl.
  CPC ......... *B01J 20/28059* (2013.01); *B01J 21/04* (2013.01); *B01J 23/63* (2013.01); *B82Y 30/00* (2013.01)
(58) Field of Classification Search
  USPC ................................................ 502/304, 415
  See application file for complete search history.

(56) References Cited

U.S. PATENT DOCUMENTS

| | | | |
|---|---|---|---|
| 9,610,564 B2 * | 4/2017 | Xue | B01J 23/63 |
| 9,611,774 B2 * | 4/2017 | Xue | B01J 35/023 |
| 10,053,400 B2 * | 8/2018 | Hossain | C07C 4/025 |
| 10,336,664 B2 * | 7/2019 | Hossain | B01J 35/0026 |
| 11,686,231 B2 * | 6/2023 | Sasaki | B01J 35/002 502/66 |
| 2014/0271427 A1 * | 9/2014 | Hoke | B01D 53/9413 502/262 |
| 2021/0283582 A1 * | 9/2021 | Liu | B01J 35/0013 |
| 2022/0193639 A1 * | 6/2022 | Vjunov | B01J 37/0244 |
| 2022/0203339 A1 * | 6/2022 | Zheng | B01J 23/46 |
| 2022/0212170 A1 * | 7/2022 | Sung | B01J 35/0006 |
| 2022/0212178 A1 * | 7/2022 | Liu | F01N 3/2842 |

OTHER PUBLICATIONS

Mann, A, et al., "Adsorption and Reaction of Acetaldehyde on Shape-Controlled CeO2 Nanocrystals: Elucidation of Structure-Function Relationships," American Chemical Society, ACS Catalysis, vol. 4, Issue 8, Jun. 12, 2014, 20 pages.

Ashcroft, N., et al., "Solid State Physics", Harcourt College Publishers, ISBN #0-03-083993-9 (College Edition), 1976, total 848 pages.

Bae, J., et al., "Mn-doped CuO-Co3O4-CeO2 catalyst with enhanced activity and durability for hydrocarbon oxidation", Molecular Catalysis 467, Jan. 28, 2019, pp. 9-15.

Bai, B., et al., "Comparison of the performance for oxidation of formaldehyde on nano-Co3O4, 2D-Co3O4, and 3D-Co3O4 catalysts", Applied Catalysis B: Environmental 142-143, Jun. 13, 2013, pp. 677-683.

Deraz, N., "The comparative jurisprudence of catalysts preparation methods: I. precipitation and impregnation methods", Journal of Industrial Environmental Chemistry, vol. 2, Issue 1, Mar. 5, 2018, 3 pages.

Develos-Bagarinao, K., et al., "Comparative studies of nanostructural and morphological evolution of CeO2 thin films induced by high-temperature annealing", IOP Publishing, Nanotechnology, vol. 18, Mar. 23, 2007, 10 total pages.

Hennings, U., et al., "Noble metal catalysts supported on gadolinium doped ceria used for natural gas reforming in fuel cell applications", Applied Catalysis B: Environmental, vol. 70, Nov. 1, 2006, pp. 498-508.

Jacobsen, S.N., et al., "Sharp microfaceting of (001)-oriented cerium dioxide thin films and the effect of annealing on surface morphology", Surface Science 429, Jan. 29, 1999, pp. 22-33.

Jeong, Hojin, et al., "Promoting Effects of Hydrothermal Treatment on the Activity and Durability of Pd/CeO2 Catalysts for CO Oxidation", ACS Catalysis, vol. 7, Sep. 11, 2017, pp. 7097-7105.

Kwak, Ja Hun, et al., "Penta-coordinated Al3+ ions as preferential nucleation sites for BaO on γ-Al2O3: An ultra-high-magnetic field 27 Al MAS NMR study", Journal of Catalysis, vol. 251, Aug. 28, 2007, pp. 189-194.

Sakthivel, Tamil Selvan, et al., "Engineering of nanoscale defect patterns in CeO2 nanorods via ex situ and in situ annealing", Nanoscale, vol. 7, Jan. 24, 2015, pp. 5169-5177.

Takeguchi, T., et al., "Determination of dispersion of precious metals on CeO2-containing supports", Applied Catalysis A: General 293, Aug. 22, 2005, pp. 91-96.

Tumuluri, U., et al., "Surface Structure Dependence of SO2 Interaction with Ceria Nanocrystals with Well-Defined Surface Facets", The Journal of Physical Chemistry, vol. 119, Dec. 2, 2015, pp. 28895-28905.

Wu, Zili, et al., "Spectroscopic Investigation of Surface-Dependent Acid-Base Property of Ceria Nanoshapes", The Journal of Physical Chemistry, vol. 119, Mar. 12, 2015, pp. 7340-7350.

Xie, Chao, et al., "Defect Chemistry in Heterogeneous Catalysis: Recognition, Understanding, and Utilization", ACS Catalysis, vol. 10, Sep. 3, 2020, pp. 11082-11098.

Zhou, You, et al., "Perspective on CO oxidation over Pd-based catalysts", Catalysis Science & Technology, vol. 5, Sep. 26, 2014, pp. 69-81.

Kim, Beom-Sik, et al., "Surface Restructuring of Supported Nano-Ceria for Improving Sulfur Resistance," ACS Catalysis, vol. 11, Jun. 3, 2021, pp. 7154-7159.

* cited by examiner

METHOD FOR IMPROVING RESISTANCE TO SULFUR-POISONING THROUGH STRUCTURAL TRANSFORMATION OF NANO-CERIA SUPPORTED ON ALUMINA

CROSS-REFERENCE TO RELATED APPLICATIONS

This application claims the benefit of Korean Patent Application No. 10-2021-0107628, filed on Aug. 13, 2021, which application is hereby incorporated herein by reference.

TECHNICAL FIELD

The present invention relates to a method for improving the resistance to sulfur-poisoning through structural transformation of nano-ceria supported by alumina.

BACKGROUND

The development of sulfur-tolerant catalysts is important, but difficult. Platinum (Pt) catalysts deposited on ceria generally exhibit high activity against oxidation, but platinum catalysts are readily converted to cerium sulfate in the presence of sulfur and undergo sulfur-poisoning, and thus activity may be greatly reduced.

Ceria (cerium oxide, $CeO_2$) is a versatile component used in a variety of applications in the energy and environmental industries. The performance of ceria in these applications is closely related to the special ability of ceria to undergo a rapid redox cycle between $Ce^{3+}$ and $Ce^{4+}$ oxidation states, releasing/capturing oxygen. These properties may be tuned by an arrangement of the terminated surface oxygen atoms, which is strongly related to the morphology of the ceria crystals.

Recently, the preparation of ceria nanocrystals having different shapes including rods, cubes, and octahedrons has received a lot of attention, and a difference in surface reaction is caused depending on surface characteristics thereof. Interestingly, a change in the ceria morphology was observed during thermal annealing. Jacobsen et al., Sakthivel et al., and De-velos-Bagarinao et al. show that when ceria is exposed to high temperatures (>800° C.), defects may be annealed, often resulting in surface patterns or microfacets. (Jacobsen, S. N. et al., Surf. Sci. 1999, 429 (1), 22-33; Sakthivel, T. S. et al., Nanoscale 2015, 7 (12), 5169-5177; and Develos-Bagarinao, K. et al., Nanotechnology 2007, 18 (16), 165605.)

Although ceria-based catalysts are widely used in automobile exhaust gas treatment, ceria-based catalysts are prone to inactivation by residual $SO_2$ in exhaust gases, resulting in a sharp decrease in catalytic activity. Upon exposure to $SO_2$, stable cerium sulfate is formed on the surface, which significantly inhibits the participation of surface active oxygen in the surface reaction, making oxidation much more difficult. Tremendous efforts have been made to improve the resistance and/or life-span of catalysts by minimizing sulfation. One strategy is to use scavengers, which add components that are more beneficial for $SO_2$ capture. In the case of the $MnO_x/CeO_2$ catalysts, sulfate formation and its decomposition are in dynamic equilibrium with high resistance to $SO_2$. Another strategy is to modify the adsorptivity of ceria to improve the $SO_2$ resistance. Doping metal atoms into the host metal oxide lattice may control the adsorption strength of sulfur species on the surface. Hennings et al. have reported that Rh supported on Gd-doped ceria exhibited better sulfur tolerance than Rh/bare ceria due to weak adsorption of $SO_2$ on the surface of Gd-doped ceria. (See Hennings, U. et al., Noble Metal Catalysts Supported on Gadolinium Doped Ceria Used for Natural Gas Reforming in Fuel Cell Applications, Appl. Catal. B 2007, 70 (1), 498-508.)

In particular, Tumuluri et al. found that a ceria octahedron with a (111) (Miller index) facet had weaker $SO_2$ adsorption and less sulfate formation compared with a ceria cube with a (100) facet. (See Tumuluri et al., Surface Structure Dependence on So2 Interaction with Ceria Nanocrystals with Well-Defined Surface Facets, J. Phys. Chem. C 2015, 119, 28895-28905.) However, these shape-controlled ceria particles are difficult to use in practice because their particle size is usually large, resulting in a low surface area. Its complex and sensitive synthesis process is an obstacle to mass production of shaped particles. In addition, ceria generally undergoes significant sintering under harsh conditions.

SUMMARY

The present invention relates to a method for improving the resistance to sulfur-poisoning through structural transformation of nano-ceria supported by alumina. Particular embodiments relate to a method for improving the resistance to sulfur-poisoning of a noble metal catalyst deposited on a ceria-alumina support through structural transformation of nano-ceria by hydrothermal treatment.

In a first embodiment, a ceria-alumina support ($CeO_2$—$Al_2O_3$ support) comprises a nano-ceria in the shape of i) polygonal bipyramids or ii) truncated polygonal bipyramids supported on alumina.

In another embodiment, a noble metal catalyst for treating exhaust gas can utilize a noble metal deposited on the ceria-alumina support as disclosed herein.

Further, a method can be used to improve resistance to sulfur-poisoning of a noble metal catalyst through structural transformation of nano-ceria supported on alumina. The method comprises a hydrothermal treatment of ceria supported on γ-alumina.

C. for 25 hours. Alumina has not been subjected to a pre-activation procedure here.

Figure 8:
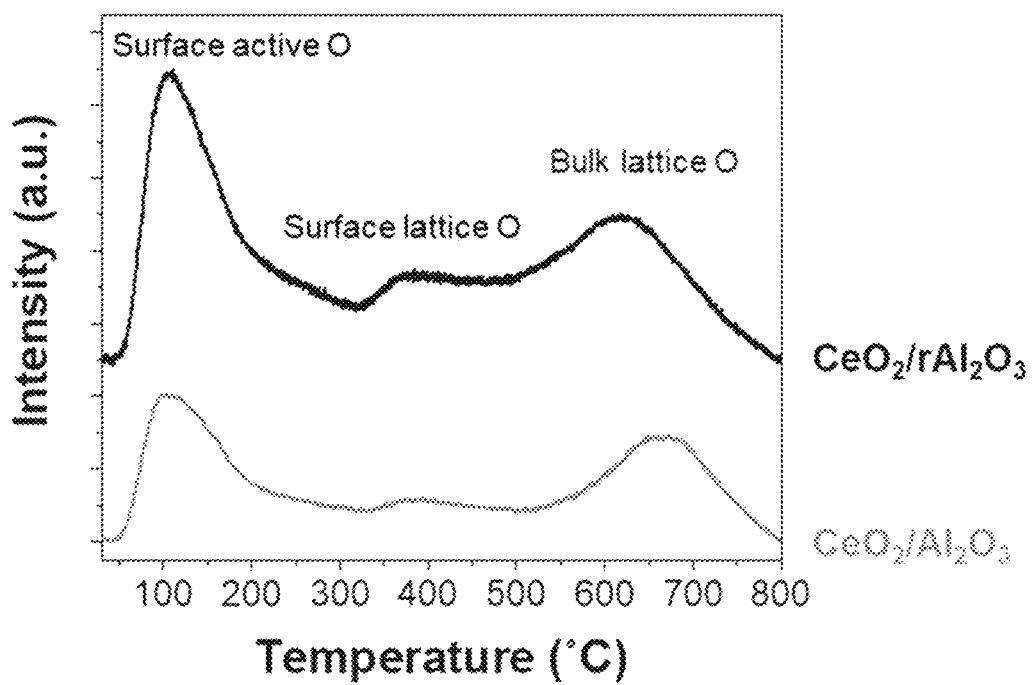

FIG. 8 shows an $O_2$-TPD profile performed after $O_2$ adsorption by flowing a 5% $O_2$ and Ar base gas (balance) at 25° C. for 2 hours.

Figure 9A:
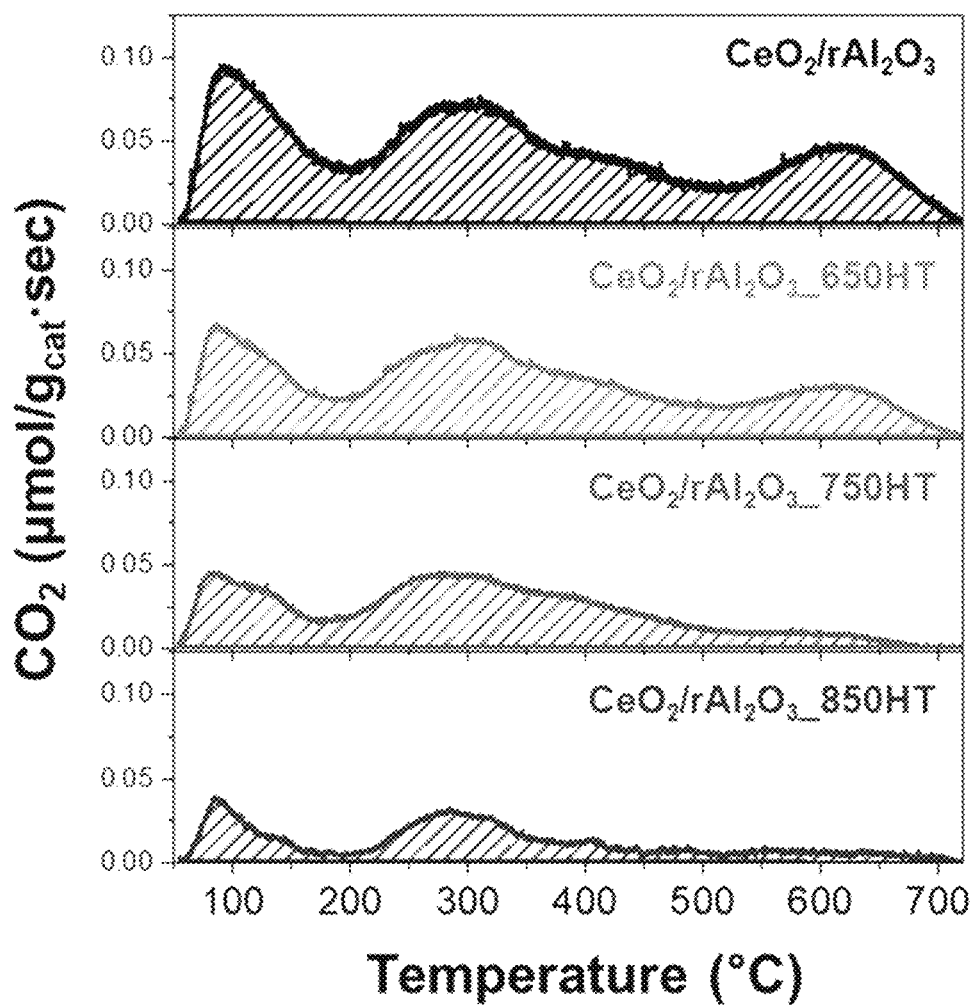

FIG. 9A shows the $CO_2$-TPD profile of the $CeO_2/rAl_2O_3$ support after $CO_2$ is adsorbed onto each catalyst at room temperature.

Figure 9B:
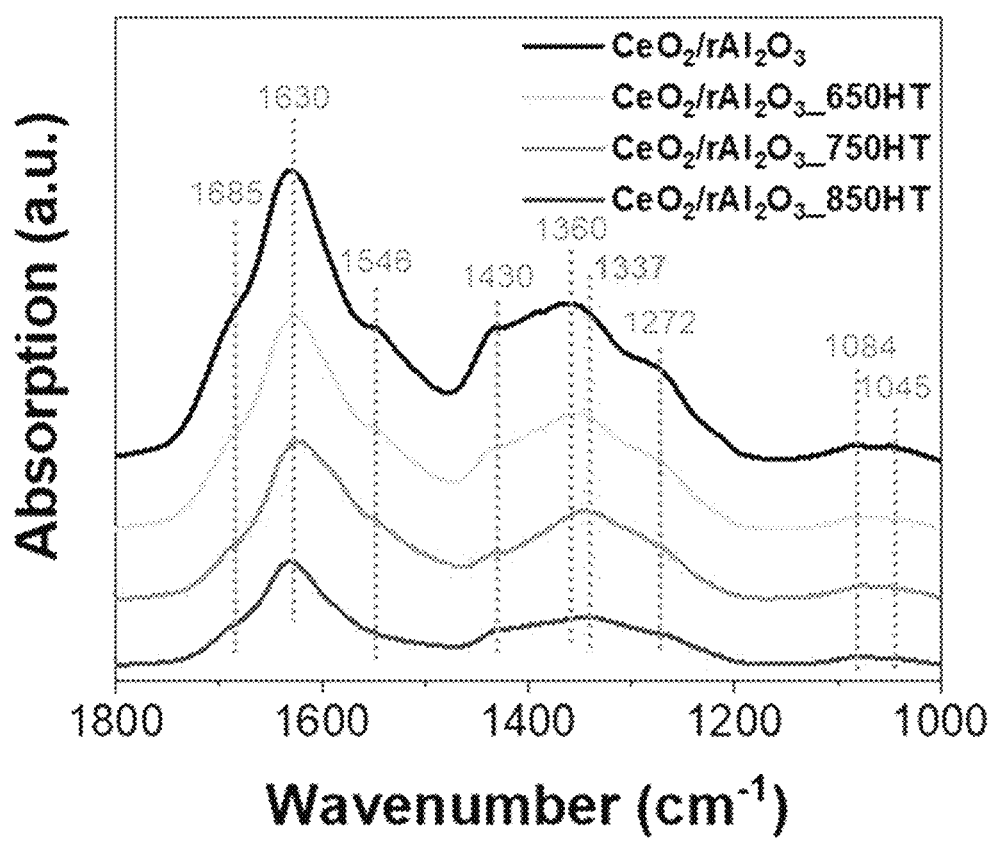

FIG. 9B shows the $CO_2$-DRIFT spectrum of the $CeO_2/rAl_2O_3$ support after $CO_2$ is adsorbed onto each catalyst at room temperature.

Figure 10:
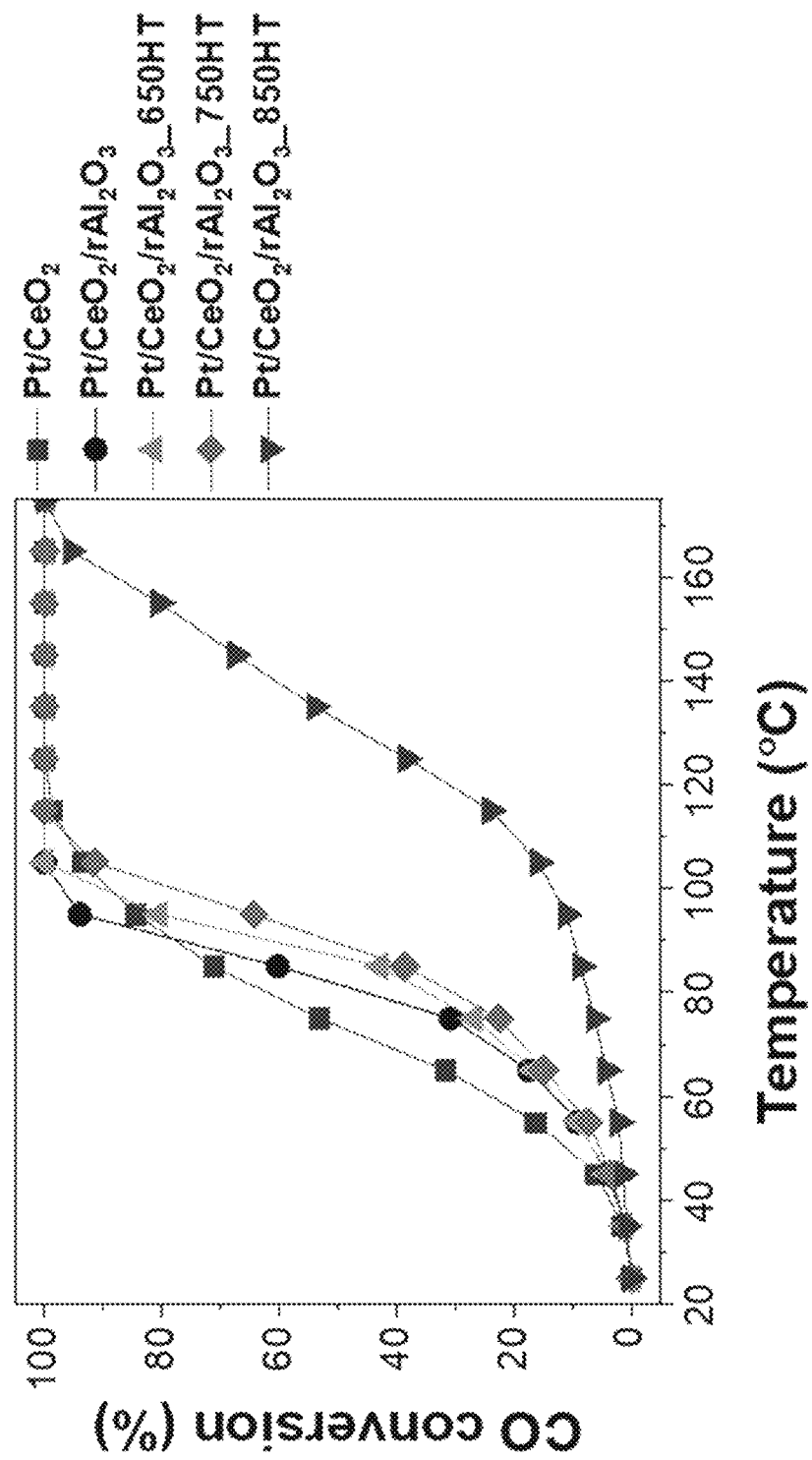

FIG. 10 shows the CO oxidation light-off curve of a Pt-loaded $CeO_2/rAl_2O_3$ catalyst.

Figure 11:
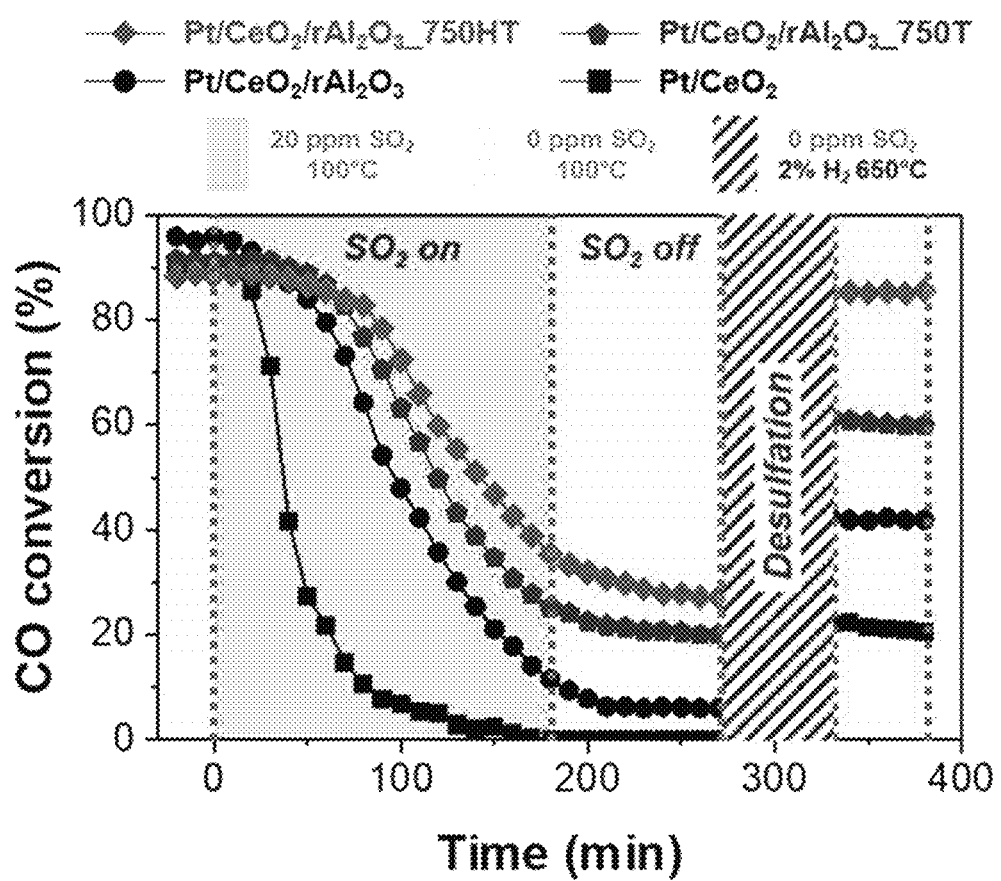

FIG. 11 shows the specific rate of CO conversion for catalysts as a function of time on a stream.

Figure 12:
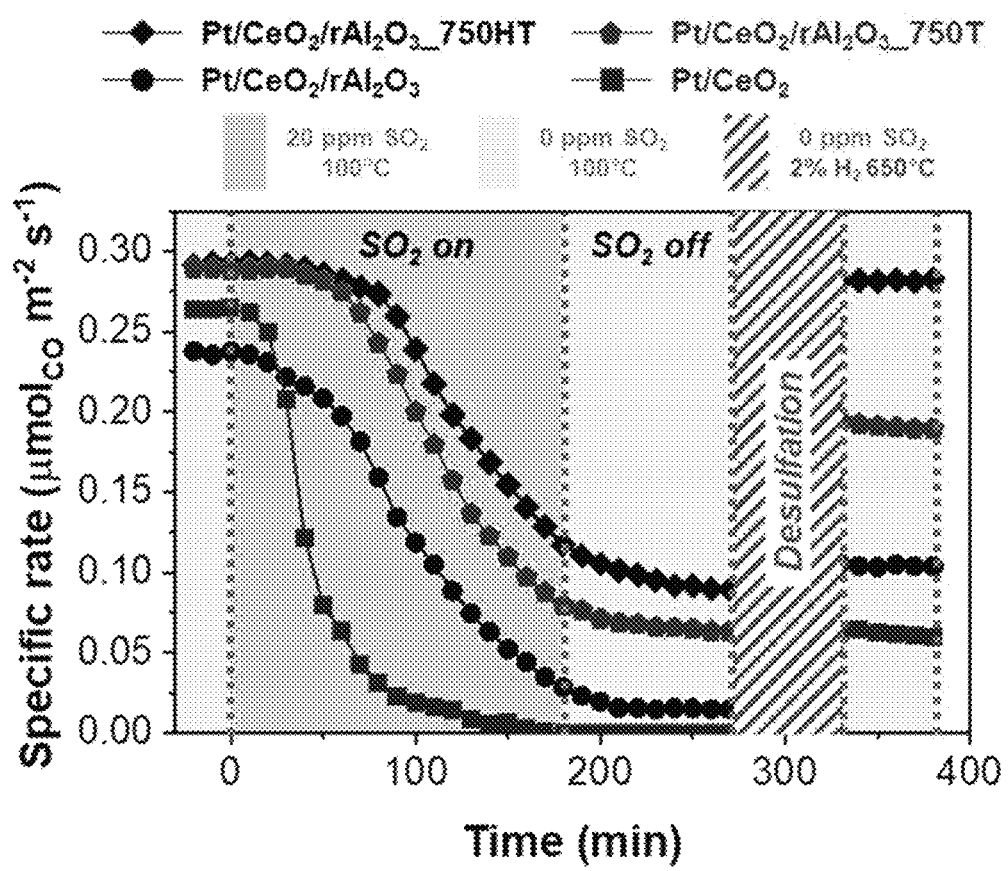

FIG. 12 shows the specific rate normalized by the catalyst surface area for the catalysts as a function of time of the stream.

Figure 13:
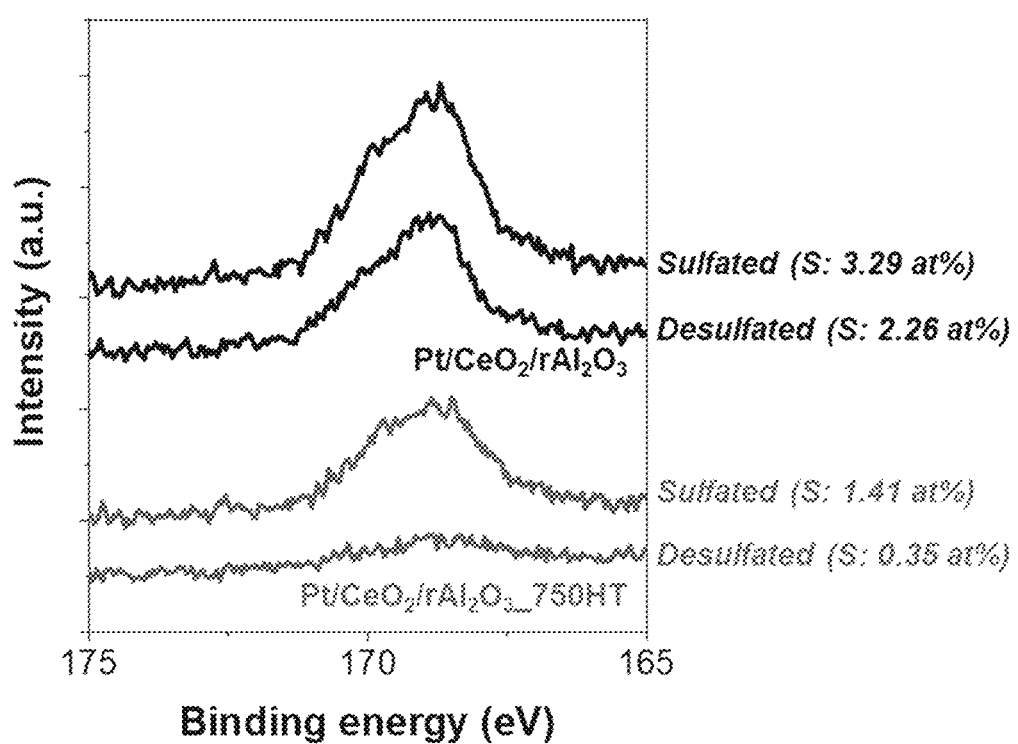

FIG. 13 shows XPS S 2p data of $Pt/CeO_2/rAl_2O_3$ and $Pt/CeO_2/rAl_2O_3\_750HT$ catalysts after sulfation and desulfation at 650° C.

Figure 14A:
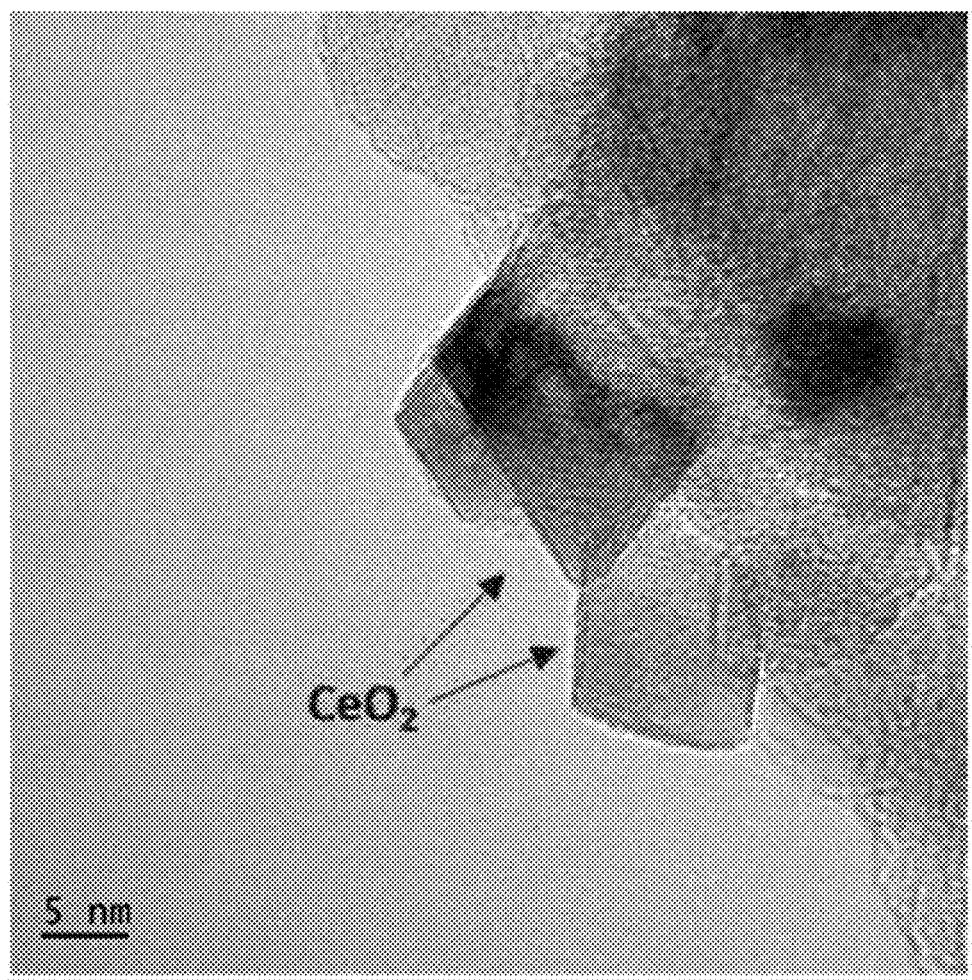

FIG. 14A shows an HR-TEM image of a $CeO_2/rAl_2O_3\_750T$ support heat-treated at 750° C. without steam.

Figure 14B:
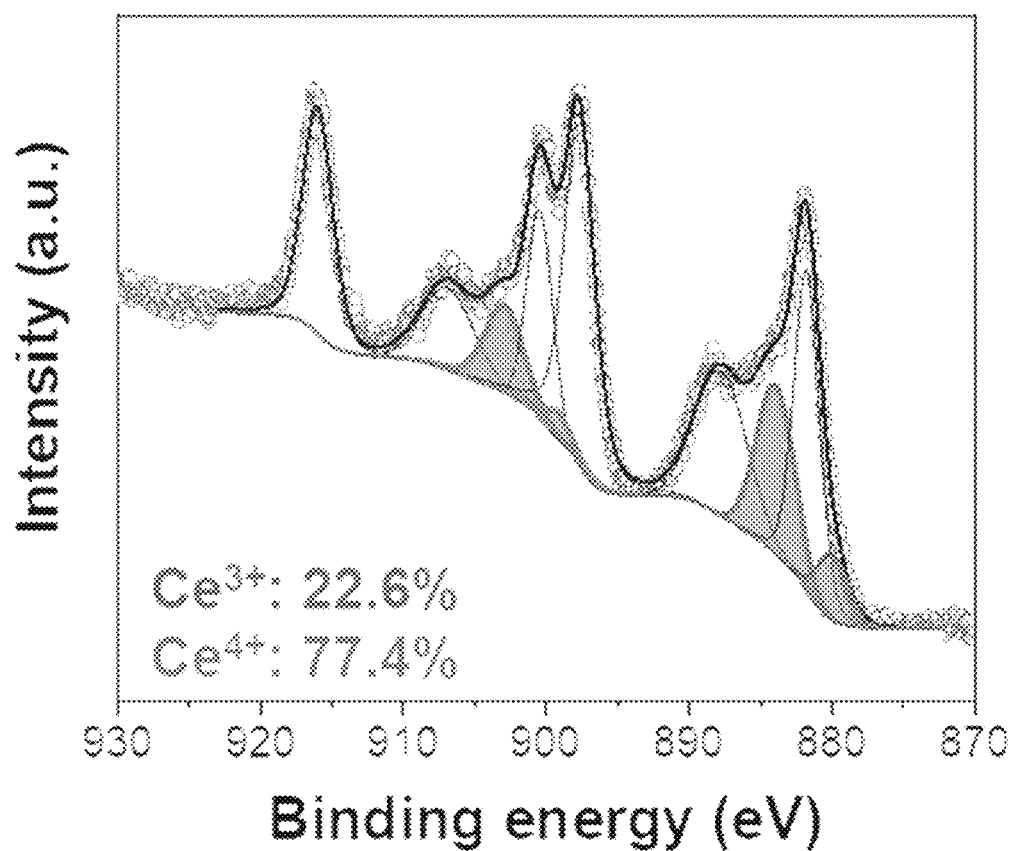

FIG. 14B shows the XPS Ce 3d spectrum of the $CeO_2/rAl_2O_3\_750T$ support heat-treated at 750° C. without steam.

Figure 15A:
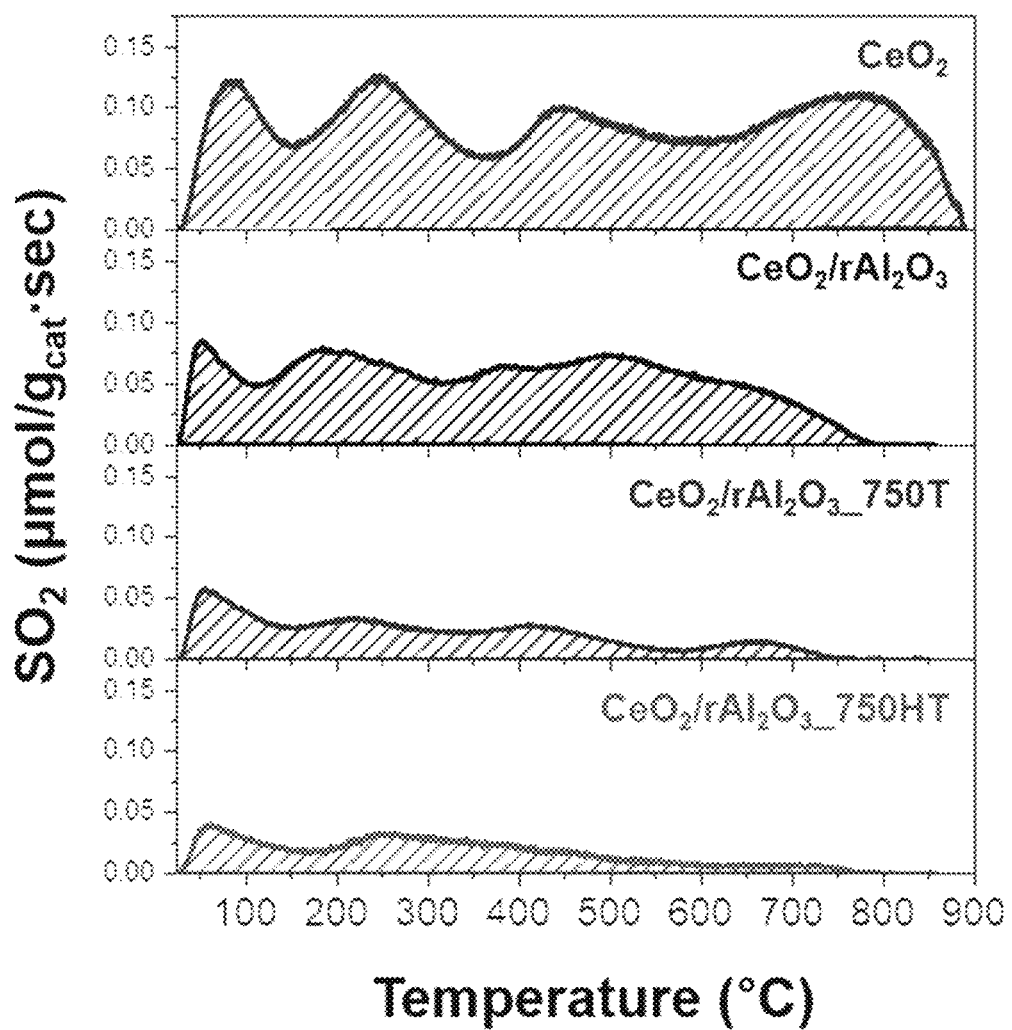

FIG. 15A shows the $SO_2$-TPD profile of a platinum-free (Pt-free) catalyst after adsorbing $SO_2$ on each catalyst by flowing 1000 ppm $SO_2$ (Ar base gas) at 30° C. for 1 hour.

Figure 15B:
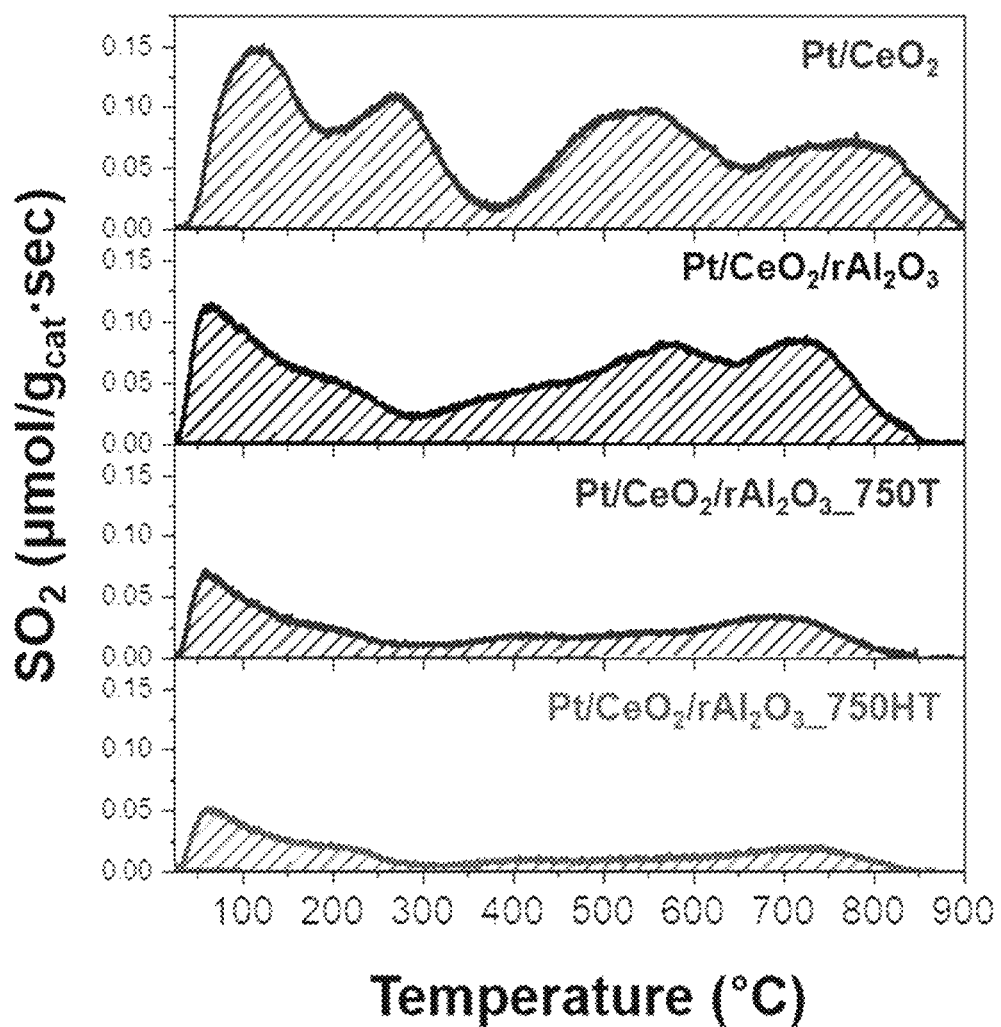

FIG. 15B shows the $SO_2$-TPD profile of a platinum-loaded (Pt-loaded) catalyst after adsorbing $SO_2$ onto each catalyst by flowing 1000 ppm $SO_2$ (Ar base gas) at 30° C. for 1 hour.

Figure 16:
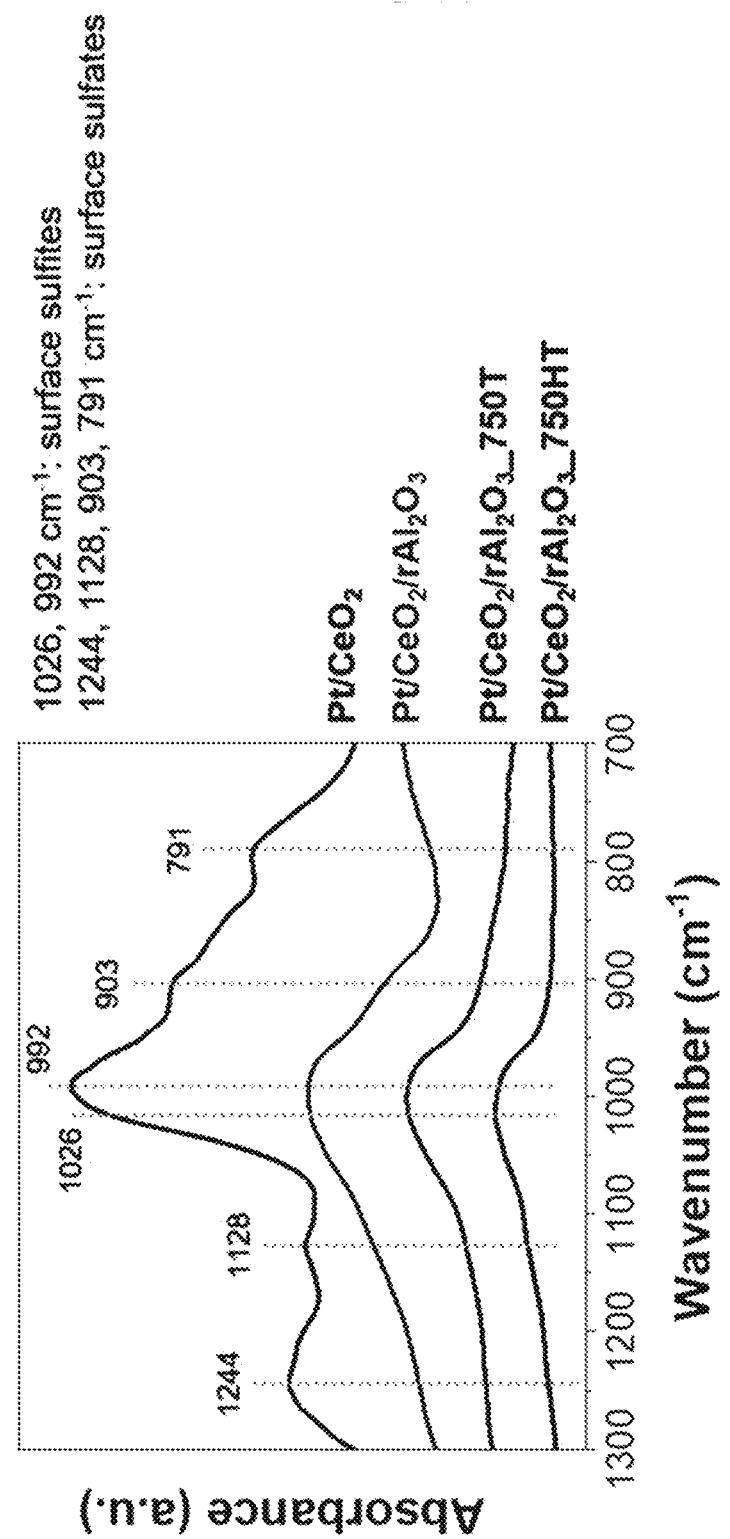

FIG. 16 shows the $SO_2$-DRIFT spectrum of the catalysts after $SO_2$ was adsorbed onto each catalyst by flowing 100 ppm $SO_2$/Ar at room temperature for 10 minutes.

Figure 17:
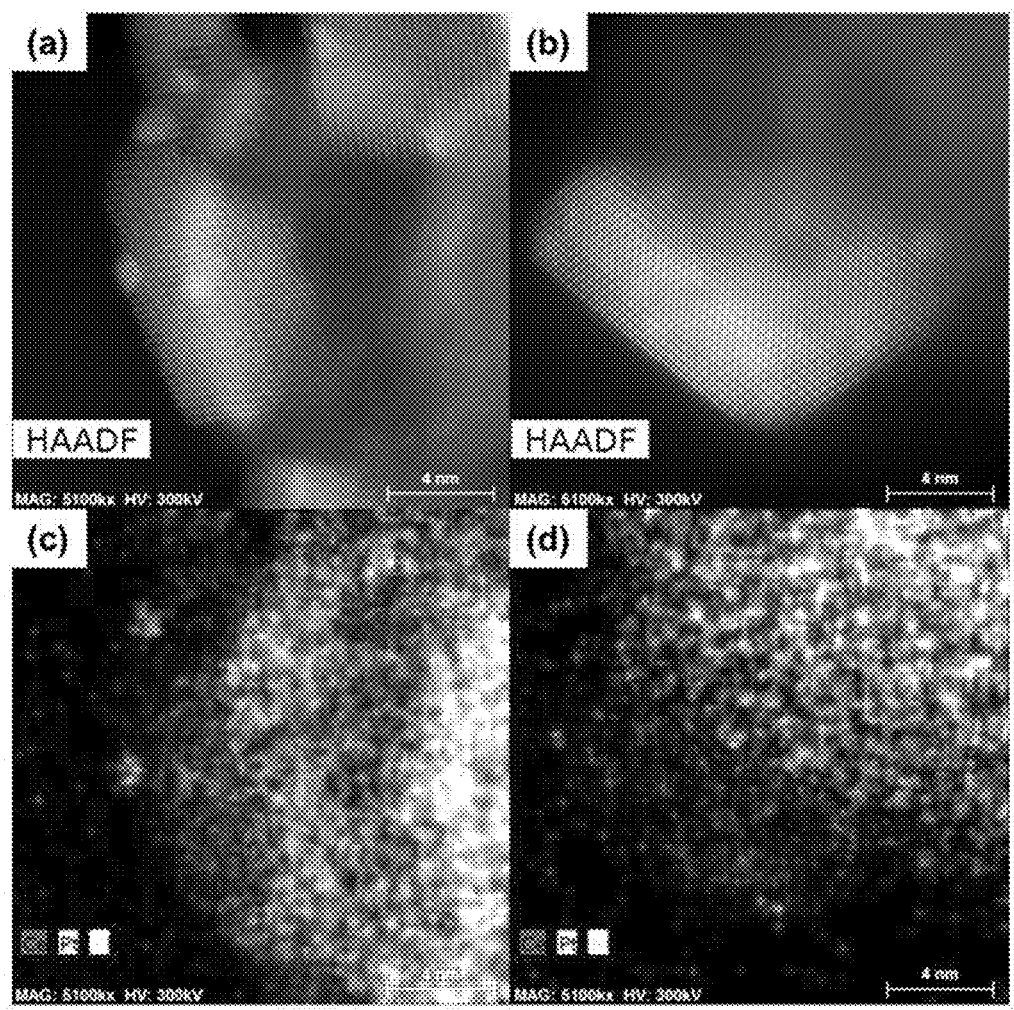

FIG. 17 shows HAADF-STEM images of (a) $Pt/CeO_2/rAl_2O_3$ and (b) $Pt/CeO_2/rAl_2O_3\_750HT$ and their corresponding EDS mapping images.

Figure 18:
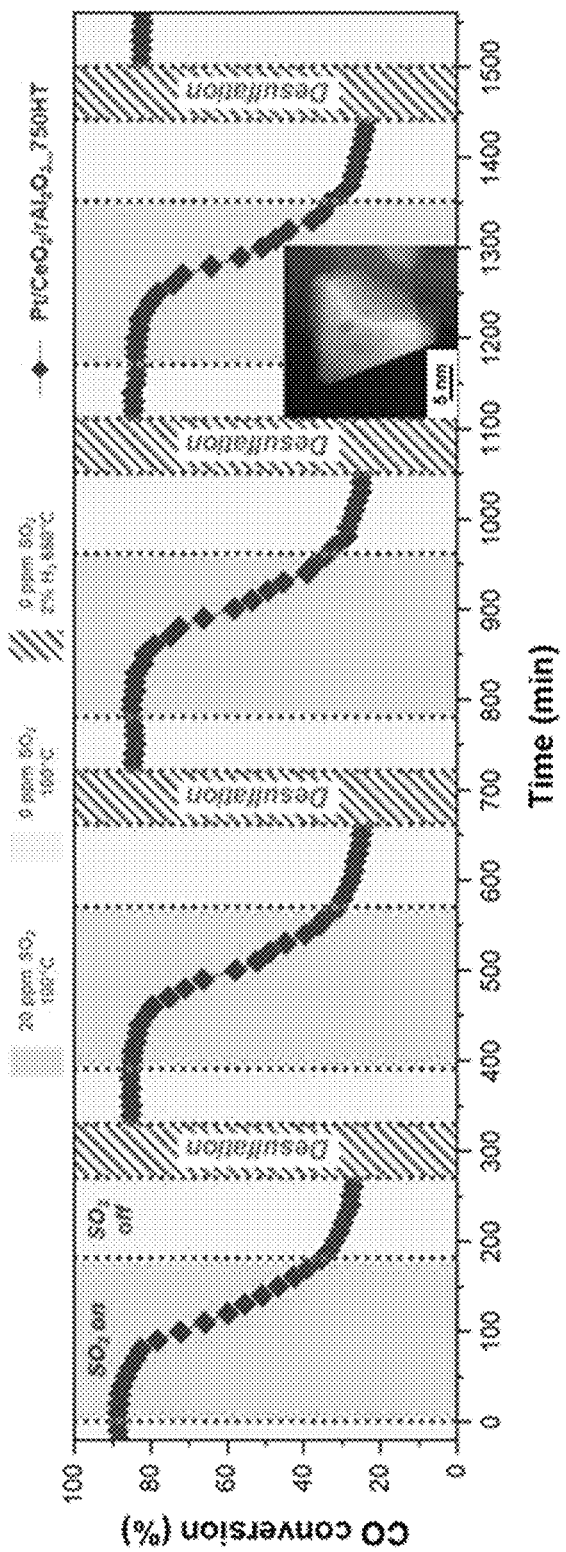

FIG. 18 shows a sulfation-desulfation cycling test for a $Pt/CeO_2/rAl_2O_3\_750HT$ catalyst at 100° C., CO oxidation. The inset figure of FIG. 18 shows a HAADF-STEM image of the $Pt/CeO_2/rAl_2O_3\_750HT$ catalyst obtained after the fourth run of the sulfide-desulfurization cycle.

Figure 19:
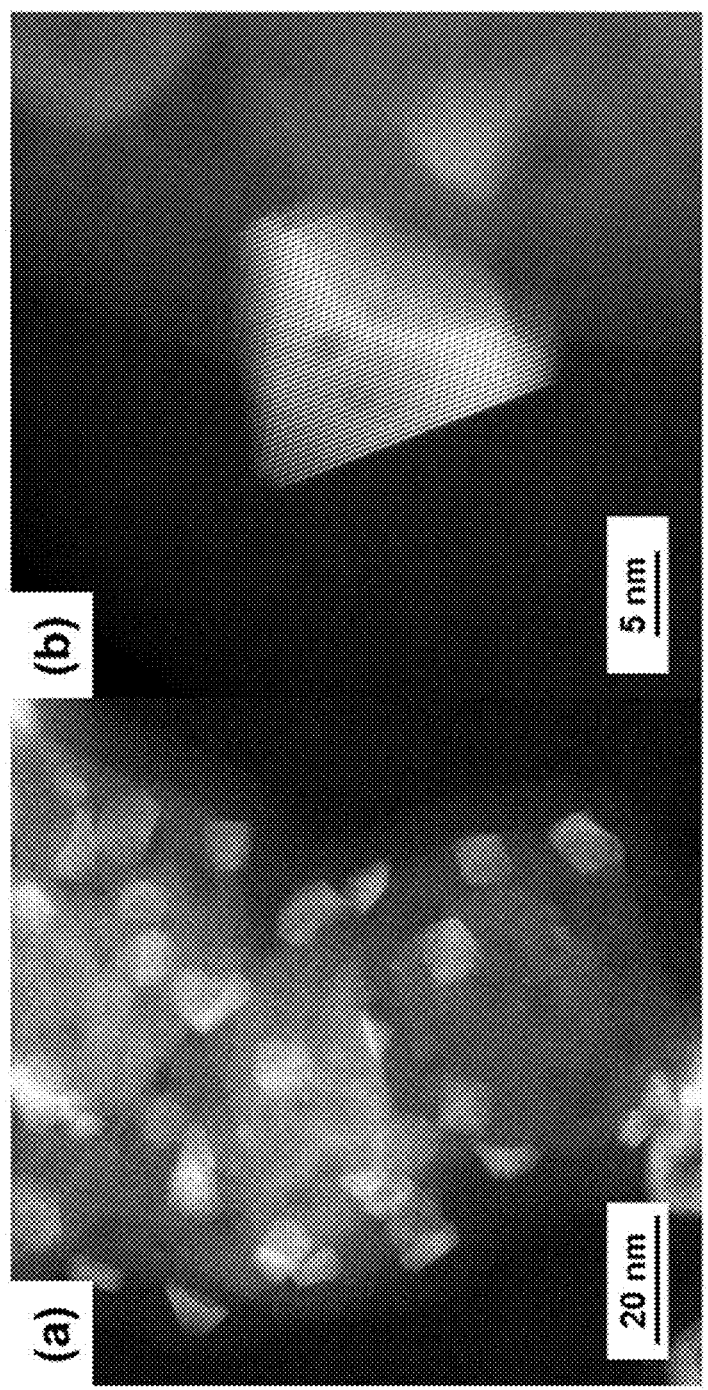

FIG. 19 shows HAADF-STEM images of the $Pt/CeO_2/rAl_2O_3\_750HT$ catalyst obtained after the fourth run of the sulfation-desulfation cycle.

Figure 20:
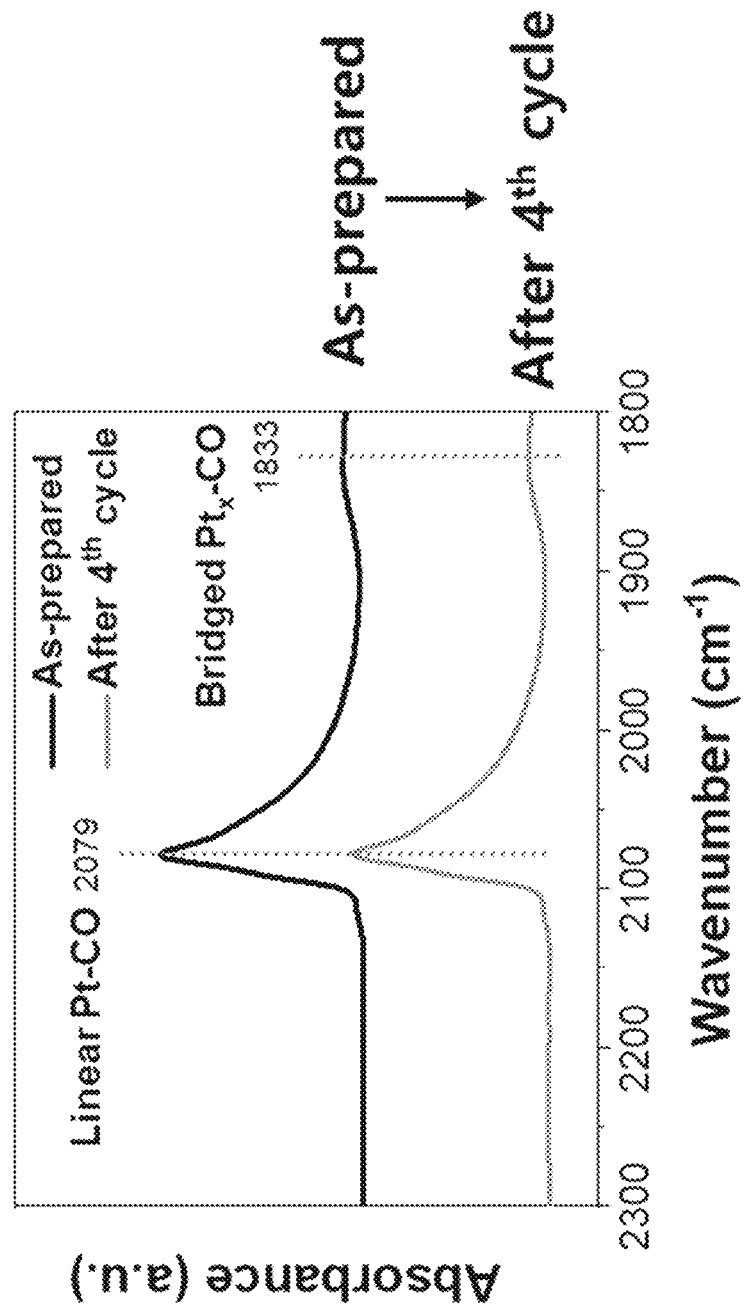

FIG. 20 shows the CO-DRIFT spectrum of the $Pt/CeO_2/rAl_2O_3\_750HT$ catalyst before the reaction and after the fourth sulfation-desulfation cycle run.

DETAILED DESCRIPTION OF ILLUSTRATIVE EMBODIMENTS

Hereinafter, embodiments of the present invention will be described. More detail is provided through examples that follow the description. These examples are only for illustrating embodiments of the present invention in more detail, and it will be apparent to those of ordinary skill in the art that the scope of the present invention is not limited by these examples according to the gist of the present invention.

The present inventors have researched to develop a ceria-based catalyst for exhaust gas treatment suitable for practical use and mass production, including shaped particles with high resistance to sulfur-poisoning and high surface area. As a result, compared to the conventional catalyst deposited on a support that has not been subjected to hydrothermal treatment, when hydrothermal treatment is performed on an alumina-ceria support, the nano-ceria structure on the surface of the support is transformed into an octahedron, and thus resistance to sulfur-poisoning (sulfur tolerance), sintering resistance, long-term stability, and surface area of the catalyst deposited on the support are improved, so that it is suitable for mass production and exhaust gas treatment, especially carbon monoxide oxidation, thereby completing embodiments of the present invention.

Accordingly, embodiments of the present invention provide a ceria-alumina support ($CeO_2$—$Al_2O_3$ support) including nano-ceria in the shape of i) polygonal bipyramids or ii) truncated polygonal bipyramids supported on alumina.

Embodiments of the present invention also provide a noble metal catalyst for treating exhaust gas in which a noble metal is deposited on the ceria-alumina support.

Embodiments of the present invention also provide a method for improving resistance to sulfur-poisoning of a noble metal catalyst through structural transformation of nano-ceria supported on alumina.

According to one embodiment of the present invention, a ceria-alumina support ($CeO_2$—$Al_2O_3$ support) includes nano-ceria in the shape of i) polygonal bipyramids or ii) truncated polygonal bipyramids supported on alumina.

The present inventors have made intensive research efforts to develop a ceria-based catalyst for exhaust gas treatment suitable for practical use and mass production, including shaped particles with high resistance to sulfur-poisoning and high surface area. As a result, compared to the conventional catalyst deposited on a support that has not been subjected to hydrothermal treatment, when the alumina-ceria support is subjected to hydrothermal treatment, the nano-ceria structure on the surface of the support is transformed into an octahedron, and the catalyst deposited on the support has improved resistance to sulfur-poisoning (sulfur tolerance), sintering resistance, long-term stability, and surface area, making it suitable for mass production and exhaust gas treatment, especially carbon monoxide oxidation.

The present inventors impregnated alumina with nano-ceria and subjected it to hydrothermal treatment to transform the shape of nano-ceria on the surface supported on alumina from a semi-spherical shape to an octahedral shape, thereby preparing an alumina-ceria support capable of imparting improved sulfur tolerance and long-term stability to the noble metal catalyst deposited on the alumina-ceria support. That is, by subjecting the ceria-alumina support to the hydrothermal treatment according to embodiments of the present invention, the $SO_2$ adsorptivity of ceria was reduced, thereby improving the resistance to sulfur-poisoning of the ceria-based noble metal catalyst.

As used herein, the term "ceria-alumina ($CeO_2$—$Al_2O_3$)" refers to a ceria support supported on alumina that has undergone hydrothermal treatment.

The ceria support supported on alumina that has not undergone hydrothermal treatment according to embodiments of the present invention, which will be described later, is referred to as "$CeO_2/rAl_2O_3$."

As used herein, the term "support" is also referred to as a carrier and is a material that accepts noble metals, stabilizers, accelerators, binders, etc. through methods commonly used in the art, such as precipitation, binding, dispersion, and impregnation, and means a material on which an active catalyst material is applied. In the support of embodiments of the present invention, a catalytic amount of a noble metal is applied thereon. For example, a catalytic amount of a noble metal is deposited on the surface of the ceria-alumina support of embodiments of the present invention.

In an embodiment of the present invention, i) the polygonal bipyramid has a crystal facet in which (hkl) is (111) on the basis of the (hkl) crystal facet defined by the Miller index, or is a trigonal bipyramid or octahedron form, or ii) the truncated polygonal bipyramid is a truncated form of a polygonal bipyramid having a crystal facet in which (hkl) is (111), or a truncated form of the trigonal bipyramid or octahedron.

As used herein, the term "Miller index" refers to a crystallographic symbol indicating a crystal facet or a lattice facet. Since the crystal facet according to the Miller index is well known to those skilled in the art, a detailed description thereof will be omitted. Relevant details can be found in Neil W. Ashcroft and N. David Mermin, Solid State Physics (Harcourt: New York, 1976).

As used herein, the term "alumina" refers to any shape of aluminum oxide.

In an embodiment of the present invention, the alumina may be at least one aluminum oxide selected from gamma-alumina, delta-alumina, theta-alumina, eta-alumina, aluminum monohydrate, aluminum trihydrate, boehmite, gibbsite, and bayerite.

In an embodiment of the present invention, the alumina is γ-alumina (gamma-phase alumina, $\gamma$-$Al_2O_3$, $rAl_2O_3$).

In this specification, γ-alumina may be denoted or referred to interchangeably as "gamma-phase alumina," "γ-alumina," "$\gamma$-$Al_2O_3$," or "$rAl_2O_3$."

As used herein, the term "γ-alumina" is one of metastable transitional alumina structural polymorphs, and γ-alumina is an active phase and a material serving as a support for the catalytically active phase. (See Ja Hun Kwak et al., Journal of Catalysis, Volume 251, Issue 1, 2007, pages 189-194.)

In an embodiment of the present invention, the alumina has an $Al^{3+}$ penta site ($Al^{3+}$ penta site). In another embodiment of the present invention, the alumina has $Al^{3+}$ penta sites on the surface. In another embodiment of the present invention, the alumina has pentacoordinate $Al^{3+}$ on the surface. The $Al^{3+}$ penta site may act as a Lewis acid site.

As used herein, the term "ceria" refers to a compound denoted as $CeO_2$ and also called cerium oxide and cerium (IV) oxide. The ceria of embodiments of the present invention may be defective ceria and may include trivalent cerium ($Ce^{3+}$) on its surface.

In an embodiment of the present invention, the ceria is defective ceria.

As used herein, the term "defect" refers to distortion of an actual crystal structure compared to an ideal lattice structure. The defects of embodiments of the present invention may include defects of the types known in the art (see ACS Catal. 2020, 10, 19, 11082-11098), such as point defects, line defects, interface defects, bulk defects, Frenkel defects, and Schottky defects, but are not necessarily limited thereto.

In a specific embodiment of the present invention, the defect is oxygen vacancy, metal vacancy, and/or high lattice strain.

In a specific embodiment of the present invention, the defect is an oxygen vacancy. Specifically, trivalent cerium ($Ce^{3+}$) exhibits oxygen vacancy formation as shown in Reaction Scheme 1.

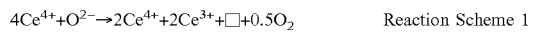

$4Ce^{4+}+O^{2-}\rightarrow 2Ce^{4+}+2Ce^{3+}+\square+0.5O_2$   Reaction Scheme 1

In Reaction Scheme 1, □ indicates oxygen vacancies.

That is, the presence of trivalent cerium on the ceria surface indicates the presence of oxygen vacancies. Specifically, the ceria-alumina support of embodiments of the present invention includes oxygen vacancies. More specifically, the ceria-alumina support of embodiments of the present invention includes oxygen vacancies on the surface.

In a specific embodiment of the present invention, the surface of the ceria-alumina support has a $Ce^{3+}$ fraction of about 35% or less and a $Ce^{4+}$ fraction of about 65% or more based on the total surface Ce.

In another embodiment of the present invention, the surface of the ceria-alumina support may have a $Ce^{3+}$ fraction of about 5% to about 35%, about 5% to about 30%, about 5% to about 25%, about 5% to about 20%, about 5% to about 15%, about 5% to about 10%, about 10% to about 35%, about 10% to about 30%, about 10% to about 25%, about 10% to about 20%, about 10% to about 15%, about 15% to about 35%, about 15% to about 30%, about 15% to about 25%, about 15% to about 20%, about 20% to about 35%, about 20% to about 30%, about 20% to about 25%, about 25% to about 35%, about 25% to about 30%, or about 30% to about 35% based on the total surface Ce.

In another embodiment of the present invention, the surface of the ceria-alumina support may have a $Ce^{4+}$ fraction of about 65% to about 95%, about 70% to about 95%, about 75% to about 95%, about 80% to about 95%, about 85% to about 95%, about 90% to about 95%, about 65% to about 90%, about 70% to about 90%, about 75% to about 90%, about 80% to about 90%, about 85% to about 90%, about 65% to about 85%, about 70% to about 85%, about 75% to about 85%, about 80% to about 85%, about 65% to about 80%, about 70% to about 80%, about 75% to about 80%, about 65% to about 75%, about 70% to about 75%, or about 65% to about 70% based on the total surface Ce.

In an embodiment of the present invention, a weight of the ceria relative to the total weight of the ceria-alumina support is about 10 wt % to about 30 wt %.

In another embodiment of the present invention, the weight of ceria relative to the total weight of the ceria-alumina support is about 10 wt % to about 30 wt %, about 10 wt % to about 25 wt %, about 10 wt % to about 20 wt %, about 10 wt % to about 15 wt %, about 15 wt % to about 30 wt %, about 15 wt % to about 25 wt %, about 15 wt % to about 20 wt %, about 20 wt % to about 30 wt %, about 20 wt % to about 25 wt %, or about 25 wt % to about 30 wt %. In a specific embodiment of the present invention, the weight of the ceria with respect to the total weight of the ceria-alumina support is about 15 wt % to about 25 wt %. In a more specific embodiment of the present invention, the weight of the ceria relative to the total weight of the ceria-alumina support is about 20 Wt %.

In an embodiment of the present invention, the nano-ceria supported on alumina without hydrothermal treatment has a diameter of less than about 10 nm.

In an embodiment of the present invention, the nano-ceria in the shape of i) polygonal bipyramids or ii) truncated polygonal bipyramids supported on the alumina has a diameter of about 10 nm to about 25 nm. The nano-ceria in the shape of i) polygonal bipyramids or ii) truncated polygonal bipyramids supported on the alumina is formed by hydrothermal treatment.

In another embodiment of the present invention, the nano-ceria in the shape of i) polygonal bipyramids or ii) truncated polygonal bipyramids supported on the alumina may have a diameter of about 10 nm to about 25 nm, about 10 nm to about 20 nm, about 10 nm to about 15 nm, about 15 nm to about 25 nm, about 15 nm to about 20 nm, or about 20 nm to about 25 nm, but is not necessarily limited thereto.

In another embodiment of the present invention, the nano-ceria in the shape of i) polygonal bipyramids or ii) truncated polygonal bipyramids supported on the alumina may have a diameter of about 13.7 nm, about 15.9 nm, or about 23.8 nm.

In an embodiment of the present invention, the ceria-alumina support ($CeO_2$—$Al_2O_3$ support) includes a nano-ceria in the shape of i) an octahedron or ii) a truncated octahedron supported on alumina.

In a specific embodiment of the present invention, the nano-ceria in the shape of an octahedron or a truncated octahedron supported on the alumina may have a diameter of about 13.7 nm, about 15.9 nm, and about 23.8 nm by hydrothermal treatment at about 650° C., about 750° C., and about 850° C., respectively.

In a specific embodiment of the present invention, the nano-ceria in the shape of an octahedron or a truncated octahedron supported on the alumina has a diameter of about 10 nm to about 25 nm.

In another embodiment of the present invention, the nano-ceria in the shape of an octahedron or a truncated octahedron supported on the alumina may have a diameter of about 10 nm to about 25 nm, about 10 nm to about 20 nm, about 10 nm to about 15 nm, about 15 nm to about 25 nm, about 15 nm to about 20 nm, or about 20 nm to about 25 nm, but is not necessarily limited thereto.

In another embodiment of the present invention, the nano-ceria in the shape of an octahedron or a truncated octahedron supported on the alumina may have a diameter of about 13.7 nm, about 15.9 nm, and about 23.8 nm.

In a specific embodiment of the present invention, the nano-ceria in the shape of an octahedron or a truncated octahedron supported on the alumina may have a diameter of about 13.7 nm, about 15.9 nm, and about 23.8 nm by hydrothermal treatment at about 650° C., about 750° C., and about 850° C., respectively.

In the present specification, the surface area refers to a Brunauer-Emmett-Teller (BET) surface area.

In an embodiment of the present invention, the ceria-alumina support has a BET surface area of about 30 $m^2$/g to about 90 $m^2$/g.

In another embodiment of the present invention, the ceria-alumina support may have a BET surface area of about 30 $m^2$/g to about 90 $m^2$/g, about 30 $m^2$/g to about 85 $m^2$/g, about 30 $m^2$/g to about 80 $m^2$/g, about 30 $m^2$/g to about 75 $m^2$/g, about 30 $m^2$/g to about 70 $m^2$/g, about 30 $m^2$/g to about 65 $m^2$/g, about 30 $m^2$/g to about 60 $m^2$/g, about 30 $m^2$/g to about 55 $m^2$/g, about 30 $m^2$/g to about 50 $m^2$/g, about 30 $m^2$/g to about 45 $m^2$/g, about 30 $m^2$/g to about 40 $m^2$/g, about 30 $m^2$/g to about 35 $m^2$/g, about 35 $m^2$/g to about 90 $m^2$/g, about 35 $m^2$/g to about 85 $m^2$/g, about 35 $m^2$/g to about 80 $m^2$/g, about 35 $m^2$/g to about 75 $m^2$/g, about 35 $m^2$/g to about 70 $m^2$/g, about 35 $m^2$/g to about 65 $m^2$/g, about 35 $m^2$/g to about 60 $m^2$/g, about 35 $m^2$/g to about 55 $m^2$/g, about 35 $m^2$/g to about 50 $m^2$/g, about 35 $m^2$/g to about 45 $m^2$/g, about 35 $m^2$/g to about 40 $m^2$/g, about 40 $m^2$/g to about 90 $m^2$/g, about 40 $m^2$/g to about 85 $m^2$/g, about 40 $m^2$/g to about 80 $m^2$/g, about 40 $m^2$/g to about 75 $m^2$/g, about 40 $m^2$/g to about 70 $m^2$/g, about 40 $m^2$/g to about 65 $m^2$/g, about 40 $m^2$/g to about 60 $m^2$/g, about 40 $m^2$/g to about 55 $m^2$/g, about 40 $m^2$/g to about 50 $m^2$/g, about 40 $m^2$/g to about 45 $m^2$/g, about 45 $m^2$/g to about 90 $m^2$/g, about 45 $m^2$/g to about 85 $m^2$/g, about 45 $m^2$/g to about 80 $m^2$/g, about 45 $m^2$/g to about 75 $m^2$/g, about 45 $m^2$/g to about 70 $m^2$/g, about 45 $m^2$/g to about 65 $m^2$/g, about 45 $m^2$/g to about 60 $m^2$/g, about 45 $m^2$/g to about 55 $m^2$/g, about 45 $m^2$/g to about 50 $m^2$/g, about 50 $m^2$/g to about 90 $m^2$/g, about 50 $m^2$/g to about 85 $m^2$/g, about 50 $m^2$/g to about 80 $m^2$/g, about 50 $m^2$/g to about 75 $m^2$/g, about 50 $m^2$/g to about 70 $m^2$/g, about 50 $m^2$/g to about 65 $m^2$/g, about 50 $m^2$/g to about 60 $m^2$/g, about 50 $m^2$/g to about 55 $m^2$/g, about 55 $m^2$/g to about 90 $m^2$/g, about 55 $m^2$/g to about 85 $m^2$/g, about 55 $m^2$/g to about 80 $m^2$/g, about 55 $m^2$/g to about 75 $m^2$/g, about 55 $m^2$/g to about 70 $m^2$/g, about 55 $m^2$/g to about 65 $m^2$/g, about 55 $m^2$/g to about 60 $m^2$/g, about 60 $m^2$/g to about 90 $m^2$/g, about 60 $m^2$/g to about 85 $m^2$/g, about 60 $m^2$/g to about 80 $m^2$/g, about 60 $m^2$/g to about 75 $m^2$/g, about 60 $m^2$/g to about 70 $m^2$/g, about 60 $m^2$/g to about 65 $m^2$/g, about 65 $m^2$/g to about 90 $m^2$/g, about 65 $m^2$/g to about 85 $m^2$/g, about 65 $m^2$/g to about 80 $m^2$/g, about 65 $m^2$/g to about 75 $m^2$/g, about 65 $m^2$/g to about 70 $m^2$/g, about 70 $m^2$/g to about 90 $m^2$/g, about 70 $m^2$/g to about 85 $m^2$/g, about 70 $m^2$/g to about 80 $m^2$/g, about 70 $m^2$/g to about 75 $m^2$/g, about 75 $m^2$/g to about 90 $m^2$/g, about 75 $m^2$/g to about 85 $m^2$/g, about 75 $m^2$/g to about 80 $m^2$/g, about 80 $m^2$/g to about 90 $m^2$/g, about 80 $m^2$/g to about 85 $m^2$/g, or about 85 $m^2$/g to about 90 $m^2$/g, but is not necessarily limited thereto.

In a specific embodiment of the present invention, the ceria-alumina support has a BET surface area of about 30 $m^2$/g to about 52 $m^2$/g.

Conventional shape-controlled ceria particles, i.e., shaped particles, have a low surface area of about 10 $m^2$/g because their particle size is usually large, making them difficult to use in practice.

The present inventors formed shaped particles on the surface of the support by hydrothermal treatment on the alumina-ceria support, that is, the surface nano-ceria structure was structurally transformed into an octahedron. Although the particles are shaped, they exhibit a BET surface area of about 30 $m^2$/g or more, which is three times or more improved compared to the surface area of about 10 $m^2$/g of the conventional shaped particle catalyst, making them suitable for practical use.

In an embodiment of the present invention, the hydrothermal treatment is performed under an aqueous vapor flow of about 500° C. to about 1000° C. The surface nano-ceria structural transformation by the hydrothermal treatment of embodiments of the present invention is relatively simple compared to the conventional method for producing molded particles, so it is suitable for mass production.

In another embodiment of the present invention, the hydrothermal treatment may be performed under an aqueous vapor flow of about 500° C. to about 1000° C., about 500° C. to about 950° C., about 500° C. to about 900° C., about 500° C. to about 850° C., about 500° C. to about 800° C., about 500° C. to about 750° C., about 500° C. to about 700° C., about 500° C. to about 650° C., about 500° C. to about 600° C., about 500° C. to about 550° C., about 550° C. to about 1000° C., about 550° C. to about 950° C., about 550° C. to about 900° C., about 550° C. to about 850° C., about 550° C. to about 800° C., about 550° C. to about 750° C., about 550° C. to about 700° C., about 550° C. to about 650° C., about 550° C. to about 600° C., about 600° C. to about 1000° C., about 600° C. to about 950° C., about 600° C. to about 900° C., about 600° C. to about 850° C., about 600° C. to about 800° C., about 600° C. to about 750° C., about 600° C. to about 700° C., about 600° C. to about 650° C., about 650° C. to about 1000° C., about 650° C. to about 950° C., about 650° C. to about 900° C., about 650° C. to about 850° C., about 650° C. to about 800° C., about 650° C. to about 750° C., about 650° C. to about 700° C., about 700° C. to about 1000° C., about 700° C. to about 950° C., about 700° C. to about 900° C., about 700° C. to about 850° C., about 700° C. to about 800° C., about 700° C. to about 750° C., about 750° C. to about 1000° C., about 750° C. to about 950° C., about 750° C. to about 900° C., about 750° C. to about 850° C., about 750° C. to about 800° C., about 800° C. to about 1000° C., about 800° C. to about 950° C., about 800° C. to about 900° C., about 800° C. to about 850° C., about 850° C. to about 1000° C., about 850° C. to about 950° C., about 850° C. to about 900° C., about 900° C. to about 1000° C., about 900° C. to about 950° C., or about 950° C. to about 1000° C., but is not necessarily limited thereto.

In another embodiment of the present invention, the hydrothermal treatment is performed under an aqueous vapor flow of about 650° C. to about 850° C., about 600° C. to about 800° C., or about 650° C. to about 800° C.

In still another embodiment of the present invention, the hydrothermal treatment is performed under an aqueous vapor flow of about 650° C., about 750° C., or about 850° C.

In a specific embodiment of the present invention, the hydrothermal treatment is performed under an aqueous vapor flow of about 750° C.

In one embodiment of the present invention, the aqueous vapor is about 1% (v/v) to about 20% (v/v) in air.

In another embodiment of the present invention, the aqueous vapor is about 1% (v/v) to about 20% (v/v), about 1% (v/v) to about 15% (v/v), about 1% (v/v) to about 10% (v/v), about 1% (v/v) to about 5% (v/v), about 5% (v/v) to about 20% (v/v), about 5% (v/v) to about 15% (v/v), about 5% (v/v) to about 10% (v/v), about 10% (v/v) to about 20% (v/v), about 10% (v/v) to about 15% (v/v) or about 15% (v/v) to about 20% (v/v) in the air, but is not necessarily limited thereto. In another embodiment of the present invention, the aqueous vapor is about 10% (v/v) in the air.

In one embodiment of the present invention, the hydrothermal treatment is performed for about 10 hours to about 40 hours.

In another embodiment of the present invention, the hydrothermal treatment is performed for about 10 hours to about 40 hours, about 10 hours to about 35 hours, about 10 hours to about 30 hours, about 10 hours to about 25 hours, about 10 hours to about 20 hours, about 10 hours to about 15 hours, about 15 hours to about 40 hours, about 15 hours to about 35 hours, about 15 hours to about 30 hours, about 15 hours to about 25 hours, about 15 hours to about 20 hours, about 20 hours to about 40 hours, about 20 hours to about 35 hours, about 20 hours to about 30 hours, about 20 hours to about 25 hours, about 25 hours to about 40 hours, about 25 hours to about 35 hours, about 25 hours to about 30 hours, about 30 hours to about 40 hours, about 30 hours to about 35 hours, or about 35 hours to about 40 hours.

In a specific embodiment of the present invention, the hydrothermal treatment is performed for about 25 hours.

In another embodiment of the present invention, the air is balanced air used as a base gas.

In a more specific embodiment of the present invention, the hydrothermal treatment of the present invention is performed under a flow of air which is about 10% (v/v) aqueous vapor/base gas at about 650° C., about 750° C., and about 850° C. That is, the hydrothermal treatment of embodiments of the present invention is performed at about 650° C., about 750° C., and about 850° C. under a flow of air, which is a base gas containing about 10% (v/v) of aqueous vapor.

In the most specific embodiment of the present invention, the hydrothermal treatment of the present invention is performed for 25 hours under a flow of about 10% (v/v) aqueous vapor/base gas at about 650° C., about 750° C., and about 850° C.

Conventionally, defective ceria is exposed to high temperatures above about 800° C. to anneal the defects and form surface patterns or microfacets (Jacobsen, S. N. et al., Surf. Sci. 1999, 429 (1), 22-33); Sakthivel, T. S. et al., Nanoscale 2015, 7 (12), 5169-5177; and Develos-Bagarinao, K. et al., Nanotechnology 2007, 18 (16), 165605), but in embodiments of the present invention, it may be transformed into an octahedral structure even if defective ceria on the surface of the support is subjected to hydrothermal treatment at a low temperature of about 650° C., particularly about 750° C.

In an embodiment of the present invention, the nano-ceria in the octahedral shape has a lower surface sulfur species adsorption performance (adsorptivity) compared to nano-ceria on a ceria-alumina support that is not hydrothermal treated. Therefore, when the ceria-alumina support of embodiments of the present invention is used, resistance to sulfur-poisoning is improved.

As used herein, the term "poisoning" refers to a phenomenon in which the activity and selectivity of a catalyst are significantly impaired by the addition of trace substances. Specifically, as used herein, "sulfur-poisoning" refers to a phenomenon in which the activity and selectivity of a catalyst are significantly impaired by the addition of sulfur species. More specifically, as used herein, "resistance to sulfur-poisoning" refers to a property of preventing and/or reducing a phenomenon in which activity and selectivity are significantly impaired by the addition of sulfur species.

As used herein, the term "sulfur species" means a species containing sulfur itself or a sulfur atom. The sulfur species of embodiments of the present invention include sulfur oxides, sulfur compounds and sulfates.

In a specific embodiment of the present invention, the sulfur species include at least one selected from SO, $SO_2$, $SO_3$, $S_2O$, $S_2O_2$, $S_6O_2$, $S_7O_2$, $SO_3^{2-}$, $O_4^{2-}$, $SO_5^{2-}$, $S_2O_2^{-3}$, $S_2O_2^{-6}$, $S_2O_2^{-7}$, $S_2O_2^{-8}$, $S_3O_2^{-6}$, and $S_4O_2^{-6}$, but are not necessarily limited thereto.

As used herein, the term "adsorption" refers to the process by which molecules in a solution or gas phase bind to atoms on a solid or liquid surface. The opposite of adsorption is desorption.

As used herein, the term "desorption" refers to the release of a substance from or through a surface. The opposite of desorption is adsorption.

When the catalyst is exposed to residual $SO_2$ in the exhaust gas, the catalyst is easily deactivated, resulting in a sharp decrease in activity. Because stable cerium sulfate is formed on the surface of the catalyst exposed to $SO_2$, which significantly inhibits the participation of surface active oxygen in the surface reaction, it makes it difficult to treat exhaust gas using a catalyst, particularly, to remove carbon monoxide through carbon monoxide oxidation, and to remove nitrogen oxides through nitrogen oxide reduction.

The ceria-alumina support subjected to hydrothermal treatment according to embodiments of the present invention significantly lowers the adsorptivity of $SO_2$ to the catalyst surface, even if the catalyst is exposed to $SO_2$, $SO_2$ is easily desorbed, i.e., it is easily detached, the activity of the catalyst may be stably maintained for a long period of time, and the life-span of the catalyst may be significantly increased compared to the conventional ceria-based catalyst. Therefore, the ceria-alumina support according to embodiments of the present invention can significantly improve the activity, long-term stability, and life-span of the noble metal of a catalytic amount deposited on the support, so that it is suitable for practical and industrial use.

Another embodiment of the present invention includes a noble metal catalyst for treating exhaust gas in which a noble metal is deposited on the ceria-alumina support according to the aforementioned embodiment.

The noble metal catalyst for treating exhaust gas according to embodiments of the present invention is a catalyst in which a noble metal is deposited or loaded on a ceria-alumina support for improving sulfur tolerance of a noble metal catalyst by hydrothermal treatment according to the aforementioned embodiment, and thus it may have improved sulfur tolerance compared to a catalyst that is not subjected to hydrothermal treatment, and may be usefully used for exhaust gas treatment.

As used herein, the term "deposition" refers to a state in which the supported noble metal is superficially placed on the surface of the support.

In an embodiment of the present invention, the noble metal is at least one selected from rhodium (Rh), palladium (Pd), and platinum (Pt). In a specific embodiment of the present invention, the noble metal is platinum.

In an embodiment of the present invention, a weight of the noble metal with respect to the total weight of the noble metal catalyst is about 0.1 wt % to about 1.0 wt %.

In another embodiment of the present invention, the weight of the noble metal with respect to the total weight of the noble metal catalyst is about 0.1 wt % to about 1.0 wt %, about 0.1 wt % to about 0.9 wt %, about 0.1 wt % to about 0.8 wt %, about 0.1 wt % to about 0.7 wt %, about 0.1 wt % to about 0.6 wt %, about 0.1 wt % to about 0.5 wt %, about 0.1 wt % to about 0.4 wt %, about 0.1 wt % to about 0.3 wt %, about 0.1 wt % to about 0.2 wt %, about 0.2 wt % to about 1.0 wt %, about 0.2 wt % to about 0.9 wt %, about 0.2 wt % to about 0.8 wt %, about 0.2 wt % to about 0.7 wt %, about 0.2 wt % to about 0.6 wt %, about 0.2 wt % to about 0.5 wt %, about 0.2 wt % to about 0.4 wt %, about 0.2 wt % to about 0.3 wt %, about 0.3 wt % to about 1.0 wt %, about 0.3 wt % to about 0.9 wt %, about 0.3 wt % to about 0.8 wt %, about 0.3 wt % to about 0.7 wt %, about 0.3 wt % to about 0.6 wt %, about 0.3 wt % to about 0.5 wt %, about 0.3 wt % to about 0.4 wt %, about 0.4 wt % to about 1.0 wt %, about 0.4 wt % to about 0.9 wt %, about 0.4 wt % to about 0.8 wt %, about 0.4 wt % to about 0.7 wt %, about 0.4 wt % to about 0.6 wt %, about 0.4 wt % to about 0.5 wt %, about 0.5 wt % to about 1.0 wt %, about 0.5 wt % to about 0.9 wt %, about 0.5 wt % to about 0.8 wt %, about 0.5 wt % to about 0.7 wt %, about 0.5 wt % to about 0.6 wt %, about 0.6 wt % to about 1.0 wt %, about 0.6 wt % to about 0.9 wt %, about 0.6 wt % to about 0.8 wt %, about 0.6 wt % to about 0.7 wt %, about 0.7 wt % to about 1.0 wt %, about 0.7 wt % to about 0.9 wt %, about 0.7 wt % to about 0.8 wt %, about 0.8 wt % to about 1.0 wt %, about 0.8 wt % to about 0.9 wt %, or about 0.9 wt % to about 1.0 wt %, but is not necessarily limited thereto.

In a specific embodiment of the present invention, the weight of the noble metal with respect to the total weight of the noble metal catalyst is about 0.5 wt %.

The noble metal catalyst for treating exhaust gas in which a noble metal is deposited on a ceria-alumina support according to embodiments of the present invention has improved sulfur tolerance, and thus it may be usefully used to treat exhaust gas, and in particular, it may be usefully used to remove carbon monoxide by oxidizing carbon monoxide in automobile exhaust gas.

As used herein, the term "exhaust gas" refers to a gaseous substance that is combusted or not combusted remaining after combustion of a mixed gas of air and fuel. The exhaust gas may be discharged from automobiles, factory chimneys, boilers, and the like.

In an embodiment of the present invention, the exhaust gas includes at least one selected from hydrocarbon gas (HmCn), nitrogen oxide (NOx), sulfur oxide (SOx), and carbon monoxide (CO), and it is not necessarily limited thereto, and m, n, and x are rational numbers. The exhaust gas may also contain lead compounds and particulate solid materials (particulate matters).

The hydrocarbon gas may be an unburned hydrocarbon (HC). The unburned hydrocarbons are incompletely burned or partially burned hydrocarbons, and include, but are not limited to, aldehydes, ketones, carboxylic acids, acetylenes, ethylenes, and polycyclic hydrocarbons, but are not necessarily limited thereto. The nitrogen oxide (NOx) may be NO, $N_2O$, and/or $NO_2$, but is not necessarily limited thereto. The sulfur oxide (SOx) may be SO, $SO_2$, $SO_3$, $S_2O$, $S_2O_2$, $S_6O_2$, $S_7O_2$, $SO_3^{2-}$, $SO_4^{2-}$, $SO_5^{2-}$, $S_2O_2^{-3}$, $S_2O_2^{-6}$, $S_2O_2^{-7}$, $S_2O_2^{-8}$, $S_3O_2^{-6}$, and/or $S_4O_2^{-6}$, but is not necessarily limited thereto. The lead compound may be $Pb(C_2H_5)_4$ and/or $Pb(CH_3)_4$, but is not limited thereto. The particulate solid material may be a solid particulate made of hydrogen and carbon having an average particle diameter of about 0.1 μm to about 0.3 μm, but is not necessarily limited thereto.

In an embodiment of the present invention, the exhaust gas treatment includes a carbon monoxide oxidation reaction. The carbon monoxide oxidation reaction removes carbon monoxide.

The noble metal catalyst for treating exhaust gas according to embodiments of the present invention has high resistance to sulfur-poisoning and surface area compared to conventional noble metal catalysts, and maintains stable activity for a long period of time to be usefully used for exhaust gas treatment, that is, the removal of hydrocarbon gas, nitrogen oxides, sulfur oxides, and/or carbon monoxide in the exhaust gas.

In a specific embodiment of the present invention, the carbon monoxide oxidation reaction may be performed by reacting the noble metal catalyst according to embodiments of the present invention with carbon monoxide (CO) and oxygen ($O_2$) at 100° C.

As used herein, the term "carbon monoxide (CO)" refers to a colorless, odorless, poisonous, and lethal gas. Carbon monoxide may be produced by incomplete burning or partial oxidation of various fuels such as coal, gasoline and natural gas. Therefore, it is important to remove carbon monoxide from confined spaces or various residual gases, and especially since trace amounts of carbon monoxide are detrimental to platinum catalysts in applications such as fuel cells, purification to remove carbon monoxide from the feed gas is essential. (Catal. Sci. Technol., 2015, 5, 69-81.)

Accordingly, it will be understood by those skilled in the art that the noble metal catalyst for treating exhaust gas according to embodiments of the present invention may also be used to remove carbon monoxide contained in the feed gas.

Carbon monoxide oxidation (CO oxidation) is an exothermic reaction in which carbon monoxide and oxygen react to generate carbon dioxide, and carbon monoxide can be removed. Carbon monoxide oxidation may be catalyzed with a non-noble metal catalyst and a supported noble metal catalyst. The non-noble metal catalyst may include copper, cobalt and manganese-based catalysts, representative commercial catalysts thereof may include hopcalite, and the supported noble metal catalysts may include platinum, palladium, gold, and ruthenium-based catalysts. (See Catal. Sci. Technol., 2015, 5, 69-81.)

Since the noble metal catalyst supported on the ceria-alumina support according to embodiments of the present invention has improved resistance to sulfur-poisoning and is stable for a long period of time, when the noble metal catalyst according to embodiments of the present invention is used, the carbon monoxide oxidation reaction may be stably catalyzed for a long period of time, and carbon monoxide, which has a detrimental effect on the noble metal catalyst used in the fuel cell, may be effectively removed.

In a specific embodiment of the present invention, the noble metal catalyst maintains the octahedral shape of nano-ceria before and after sulfation and desulfation during the carbon monoxide oxidation reaction.

In a specific embodiment of the present invention, the sulfation is a reaction in which sulfur dioxide ($SO_2$) is contacted with the noble metal catalyst of embodiments of the present invention at about 50° C. to about 150° C. to form an ester or salt of sulfate.

In another embodiment of the present invention, the sulfation is a reaction in which sulfur dioxide ($SO_2$) is contacted with the noble metal catalyst of embodiments of the present invention to form an ester or salt of a sulfate at about 50° C. to about 150° C., about 50° C. to about 140° C., about 50° C. to about 130° C., about 50° C. to about 120° C., about 50° C. to about 110° C., about 50° C. to about 100° C., about 50° C. to about 90° C., about 50° C. to about 80° C., about 50° C. to about 70° C., about 50° C. to about 60° C., about 60° C. to about 150° C., about 60° C. to about 140° C., about 60° C. to about 130° C., about 60° C. to about 120° C., about 60° C. to about 110° C., about 60° C. to about 100° C., about 60° C. to about 90° C., about 60° C. to about 80° C., about 60° C. to about 70° C., about 70° C. to about 150° C., about 70° C. to about 140° C., about 70° C. to about 130° C., about 70° C. to about 120° C., about 70° C. to about 110° C., about 70° C. to about 100° C., about 70° C. to about 90° C., about 70° C. to about 80° C., about 80° C. to about 150° C., about 80° C. to about 140° C., about 80° C. to about 130° C., about 80° C. to about 120° C., about 80° C. to about 110° C., about 80° C. to about 100° C., about 80° C. to about 90° C., about 90° C. to about 150° C., about 90° C. to about 140° C., about 90° C. to about 130° C., about 90° C. to about 120° C., about 90° C. to about 110° C., about 90° C. to about 100° C., about 100° C. to about 150° C., about 100° C. to about 140° C., about 100° C. to about 130° C., about 100° C. to about 120° C., about 100° C. to about 110° C., about 110° C. to about 150° C., about no ° C. to about 140° C., about no ° C. to about 130° C., about no ° C. to about 120° C., about 120° C. to about 150° C., about 120° C. to about 140° C., about 120° C. to about 130° C., about 130° C. to about 150° C., about 130° C. to about 140° C., or about 140° C. to about 150° C.

In a specific embodiment of the present invention, the desulfation is a reaction in which hydrogen ($H_2$) is contacted with the noble metal catalyst of embodiments of the present invention at about 500° C. to about 800° C. to remove sulfate.

In another embodiment of the present invention, the desulfation is a reaction in which sulfate is removed by contact with the noble metal catalyst of embodiments of the present invention at about 500° C. to about 800° C., about 500° C. to about 750° C., about 500° C. to about 700° C., about 500° C. to about 650° C., about 500° C. to about 600° C., about 500° C. to about 550° C., about 550° C. to about 800° C., about 550° C. to about 750° C., about 550° C. to about 700° C., about 550° C. to about 650° C., about 550° C. to about 600° C., about 600° C. to about 800° C., about 600° C. to about 750° C., about 600° C. to about 700° C., about 600° C. to about 650° C., about 650° C. to about 800° C., about 650° C. to about 750° C., about 650° C. to about 700° C., about 700° C. to about 800° C., about 700° C. to about 750° C., or about 750° C. to about 800° C.

In a specific embodiment of the present invention, in the noble metal catalyst, the carbon monoxide conversion rate (CO conversion, %) after the sulfation and desulfation during the carbon monoxide oxidation reaction is restored to the carbon monoxide conversion rate before sulfation.

As used herein, the term "carbon monoxide conversion rate" refers to a percentage ratio of the number of moles of carbon monoxide consumed as carbon monoxide reacts with oxygen to convert to carbon dioxide with respect to the number of moles of carbon monoxide before the reaction. The carbon monoxide conversion (%) of embodiments of the present invention is calculated by dividing the difference between the number of moles of carbon monoxide added to the reactants before the oxidation reaction and the number of moles of carbon monoxide contained in the product after the oxidation reaction by the number of moles of carbon monoxide added to the reactants and by multiplying by 100.

The reaction scheme of the carbon monoxide oxidation reaction is as shown in reaction scheme 2.

$$2CO+O_2 \rightarrow 2O_2 \qquad \text{Reaction Scheme 2}$$

In a specific embodiment of the present invention, in the noble metal catalyst, when the carbon monoxide is oxidized, the specific rate for carbon monoxide conversion after sulfation and desulfation (specific rate, $\mu mol_{co}$ m$^{-2}$s$^{-1}$) is restored to the specific rate before sulfation.

In another embodiment of the present invention, in the noble metal catalyst, when the carbon monoxide is oxidized, the reaction rate for carbon monoxide conversion after the sulfation and desulfation is restored to the reaction rate before sulfation.

The reaction rate for evaluating the catalytic activity of embodiments of the present specification may be calculated by dividing the number of moles of carbon monoxide reduced per hour by the mass of the noble metal. Specifically, the reaction rate (mol$_{co}$/g$_{metal}$·s) may be calculated as space velocity (mL·g/cat·h)×noble metal content (g$_{metal}$/g$_{cat}$)×CO concentration of the reaction gas×CO conversion rate at the corresponding temperature.

In a specific embodiment of the present invention, the sulfation and desulfation may be repeated once to 100 times, but is not necessarily limited thereto.

In another embodiment of the present invention, the sulfation and desulfation are repeated 4 times to 100 times. In another embodiment of the present invention, the sulfation and desulfation are repeated 4 times to 10 times, 10 times to 100 times, 10 times to 90 times, 10 times to 80 times, 10 times to 70 times, 10 times to 60 times, 10 times to 50 times, 10 times to 40 times, 10 times to 30 times, 10 times to 20 times, 20 times to 100 times, 20 times to 90 times, 20 times to 80 times, 20 times to 70 times, 20 times to 60 times, 20 times to 50 times, 20 times to 40 times, 20 times to 30 times, 30 times to 100 times, 30 times to 90 times, 30 times to 80 times, 30 times to 70 times, 30 times to 60 times, 30 times to 50 times, 30 times to 40 times, 40 times to 100 times, 40 times to 90 times, 40 times to 80 times, 40 times to 70 times, 40 times to 60 times, 40 times to 50 times, 50 times to 100 times, 50 times to 90 times, 50 times to 80 times, 50 times to 70 times, 50 times to 60 times, 60 times to 100 times, 60 times to 90 times, 60 times to 80 times, 60 times to 70 times, 70 times to 100 times, 70 times to 90 times, 70 times to 80 times, 80 times to 100 times, 80 times to 90 times, or 90 times to 100 times.

Specifically, once repetition of the sulfation and desulfation may be performed by sequentially performing the following conditions: i) 1% CO and 1% $O_2$ in 100° C., 0 ppm $SO_2$, Ar base gas; ii) 180 min, 100° C., 20 ppm $SO_2$; iii) 90 min, 100° C., 0 ppm $SO_2$, iv) 60 min, 650° C., 0 ppm $SO_2$, 2% (v/v) $H_2$; and v) 100° C., 0 ppm $SO_2$.

The noble metal catalyst for treating exhaust gas of embodiments of the present invention is restored to a specific rate before sulfation and/or a reaction rate before sulfation despite repeated exposure to the aforementioned sulfation and desulfation, and thus has excellent resistance to sulfur-poisoning and long-term safety.

In another embodiment of the present invention, the exhaust gas treatment includes a nitrogen oxide (NOx) reduction reaction. The nitrogen oxide reduction reaction removes nitrogen oxides. Nitrogen oxide is reduced to nitrogen by the nitrogen oxide reduction reaction.

Since the noble metal catalyst for treating exhaust gas of embodiments of the present invention is deposited on the ceria-alumina support, which is another embodiment of the present invention described above, overlapping descriptions are cited in order to avoid excessive complexity of the descriptions of the present specification, and the descriptions thereof are omitted.

According to another embodiment of the present invention, provided is a method for improving resistance to sulfur-poisoning of a noble metal catalyst through structural transformation of nano-ceria supported on alumina, including the following step of performing hydrothermal treatment for ceria supported on γ-alumina.

The present inventors have developed a method for improving resistance to sulfur-poisoning of a noble metal catalyst deposited on a support by performing hydrothermal treatment of the nano-ceria support supported on alumina to induce structural transformation. The conventional process of synthesizing shaped particles is complex and sensitive, so it is difficult to mass-produce, and there is a problem of undergoing sintering at a high temperature of about 500° C. or more. However, when the method for improving the resistance to sulfur-poisoning of the noble metal catalyst deposited on the support according to embodiments of the present invention is used, compared to the conventional synthesis process of shaped particles, the catalyst generation process is relatively simple, which is suitable for mass production, catalytic activity may be maintained even after a plurality of sulfation-desulfation cycles, resulting in improved long-term stability, e.g., stability of at least 25 hours, and it exhibits resistance to sintering even after at least four desulfation processes at 650° C., which is useful for practical use.

As used herein, the term "sintering" refers to a phenomenon in which solid powder is bonded and/or deposited on surfaces in contact with each other and connected to each other when the solid powder is pressed and/or heated. Sintering causes loss of activity of the supported metal catalyst, reducing the surface area of the catalyst and changing the surface structure. In general, the supported metal catalyst begins to be affected by sintering at a temperature of 500° C. or higher, and when sintered, it is difficult for the metal catalyst to maintain the nano-size. When the method for improving resistance to sulfur-poisoning according to embodiments of the present invention is used, the resistance to sintering is improved compared to the conventional ceria-based catalyst.

In an embodiment of the present invention, the structural transformation of the nano-ceria is that the nano-ceria is structurally transformed into the nano-ceria in the shape of i) polygonal bipyramids or ii) truncated polygonal bipyramids. Specifically, the nano-ceria is structurally transformed into nano-ceria in the shape of i) polygonal bipyramids or ii) truncated polygonal bipyramids after hydrothermal treatment. More specifically, the nano-ceria is structurally transformed into a crystal facet having a Miller index (111) after hydrothermal treatment. Specifically, the nano-ceria is structurally transformed into a shape of an octahedron after hydrothermal treatment.

In an embodiment of the present invention, the improvement method further includes forming an $Al^{3+}$ penta site in the γ-alumina before supporting the ceria on the γ-alumina.

In a specific embodiment of the present invention, the forming of the $Al^{3+}$ penta site in the γ-alumina is performed by activating γ-alumina under a hydrogen ($H_2$) flow at about 200° C. to about 500° C.

In another embodiment of the present invention, the forming of the $Al^{3+}$ penta site in the γ-alumina may be performed under a hydrogen ($H_2$)/nitrogen ($N_2$) flow.

In another embodiment of the present invention, the forming of the $Al^{3+}$ penta site in the γ-alumina may be performed under a hydrogen ($H_2$)/nitrogen ($N_2$) flow of about 10% (v/v).

In still another embodiment of the present invention, the forming of the $Al^{3+}$ penta site in the γ-alumina is performed for about 30 minutes to about 2 hours. In a specific embodiment of the present invention, the forming of the $Al^{3+}$ penta site in the γ-alumina is performed for about 30 minutes to about 2 hours, about 30 minutes to about 1 hour 30 minutes, about 30 minutes to about 1 hour, about 1 hour to about 2 hours, about 1 hour to about 1 hour and 30 minutes, or about 1 hour 30 minutes to about 2 hours.

In another specific embodiment of the present invention, the forming of the $Al^{3+}$ penta site in the γ-alumina is performed at 350° C. under 10% (v/v) hydrogen ($H_2$)/nitrogen ($N_2$) flow for 1 hour.

In an embodiment of the present invention, the $Al^{3+}$ penta site is unsaturated by forming the $Al^{3+}$ penta site in the γ-alumina.

In an embodiment of the present invention, the ceria supported on the γ-alumina is formed by impregnating the γ-alumina in a ceria precursor solution.

In a specific embodiment of the present invention, the ceria precursor solution includes at least one selected from $Ce(NO_3)_3$, $Ce(NO_3)_3 \cdot xH_2O$, $Ce_2(SO_4)_3$, $Ce_2(SO_4)_3 \cdot xH_2O$, $Ce_2(C_2O_4)_3$, $Ce_2(C_2O_4)_3 \cdot xH_2O$, $Ce(CH_3CO_2)_3$, $Ce(CH_3CO_2)_3 \cdot xH_2O$, $Ce_2(CO_3)_3$, $Ce_2(CO_3)_3 \cdot xH_2O$, $Ce(SO_4)_2$, $Ce(SO_4)_2 \cdot xH_2O$, $(NH_4)_2Ce(NO_3)_6$, $(NH_4)_2Ce(NO_3)_6 \cdot xH_2O$, $Ce(NH_4)_4(SO_4)_4$, $Ce(NH_4)_4(SO_4)_4 \cdot xH_2O$, and $Ce(OH)_4$, but is not necessarily limited thereto.

The $Ce(NO_3)_3 \cdot xH_2O$ includes $Ce(NO_3)_3$—$H_2O$, $Ce(NO_3)_3 \cdot 2H_2O$, $Ce(NO_3)_3 \cdot 3H_2O$, $Ce(NO_3)_3 \cdot 4H_2O$, $Ce(NO_3)_3 \cdot 5H_2O$, and $Ce(NO_3)_3 \cdot 6H_2O$, but is not necessarily limited thereto. More specifically, $Ce(NO_3)_3 \cdot xH_2O$ may be $Ce(NO_3)_3 \cdot 6H_2O$.

In a specific embodiment of the present invention, the ceria precursor solution is at least one selected from $Ce(NO_3)_3 \cdot 6H_2O$, $CeCl_3 \cdot 7H_2O$, $Ce(CH_3CO_2)_3$, $Ce_2(C_2O_4)_3$, $(NH_4)_2Ce(NO_3)_6$, $Ce(SO_4)_2$, and $Ce(OH)_4$, but is not necessarily limited thereto.

In a more specific embodiment of the present invention, the ceria precursor solution is $Ce(NO_3)_3 \cdot 6H_2O$, but is not necessarily limited thereto.

As used herein, the term "impregnation" refers to a procedure in which a specific volume of a solution containing a precursor of an active phase is contacted with a solid such as a support or other active solid phase, and dried in a subsequent step to remove the absorbed solvent. (See Deraz N M. J Ind Environ Chem. 2018; 2(1):19-21.) In embodiments of the present invention, the impregnation may be wet impregnation.

In an embodiment of the present invention, the improvement method further includes calcining the ceria supported on the γ-alumina under air at about 400° C. to about 600° C. before hydrothermal treatment.

As used herein, the term "calcination" refers to a treatment of heating at a high temperature in air or oxygen ($O_2$).

In an embodiment of the present invention, the calcining is performed under air of about 400° C. to about 600° C., about 400° C. to about 550° C., about 400° C. to about 500° C., about 400° C. to about 450° C., about 450° C. to about 600° C., about 450° C. to about 550° C., about 450° C. to about 500° C., about 500° C. to about 600° C., about 500° C. to about 550° C., or about 550° C. to about 600° C.

In an embodiment of the present invention, the hydrothermal treatment is performed under an aqueous vapor flow of about 500° C. to about 1000° C. The surface nano-ceria structural transformation by the hydrothermal treatment of embodiments of the present invention is relatively simple compared to the conventional method for producing molded particles, and thus it is suitable for mass production.

In another embodiment of the present invention, the hydrothermal treatment is performed under an aqueous vapor flow of about 500° C. to about 1000° C., about 500° C. to about 950° C., about 500° C. to about 900° C., about 500° C. to about 850° C., about 500° C. to about 800° C., about 500° C. to about 750° C., about 500° C. to about 700° C., about 500° C. to about 650° C., about 500° C. to about 600° C., about 500° C. to about 550° C., about 550° C. to about 1000° C., about 550° C. to about 950° C., about 550° C. to about 900° C., about 550° C. to about 850° C., about 550° C. to about 800° C., about 550° C. to about 750° C., about 550° C. to about 700° C., about 550° C. to about 650° C., about 550° C. to about 600° C., about 600° C. to about 1000° C., about 600° C. to about 950° C., about 600° C. to about 900° C., about 600° C. to about 850° C., about 600° C. to about 800° C., about 600° C. to about 750° C., about 600° C. to about 700° C., about 600° C. to about 650° C., about 650° C. to about 1000° C., about 650° C. to about 950° C., about 650° C. to about 900° C., about 650° C. to about 850° C., about 650° C. to about 800° C., about 650° C. to about 750° C., about 650° C. to about 700° C., about 700° C. to about 1000° C., about 700° C. to about 950° C., about 700° C. to about 900° C., about 700° C. to about 850° C., about 700° C. to about 800° C., about 700° C. to about 750° C., about 750° C. to about 1000° C., about 750° C. to about 950° C., about 750° C. to about 900° C., about 750° C. to about 850° C., about 750° C. to about 800° C., about 800° C. to about 1000° C., about 800° C. to about 950° C., about 800° C. to about 900° C., about 800° C. to about 850° C., about 850° C. to about 1000° C., about 850° C. to about 950° C., about 850° C. to about 900° C., about 900° C. to about 1000° C., about 900° C. to about 950° C., or about 950° C. to about 1000° C., but is not necessarily limited thereto.

In another embodiment of the present invention, the hydrothermal treatment is performed under an aqueous vapor flow of about 650° C. to about 850° C., about 600° C. to about 800° C., or about 650° C. to about 800° C.

In still another embodiment of the present invention, the hydrothermal treatment is performed under an aqueous vapor flow of about 650° C., about 750° C., or about 850° C.

In a specific embodiment of the present invention, the hydrothermal treatment is performed under an aqueous vapor flow of about 750° C.

In a specific embodiment of the present invention, the hydrothermal treatment is performed under a 10% (v/v) aqueous vapor/air flow.

In another embodiment of the present invention, the hydrothermal treatment transforms the nano-ceria structure on the surface supported on alumina into an octahedral shape.

In an embodiment of the present invention, the improvement method further includes the following steps after hydrothermal treatment of the ceria supported on the γ-alumina:

a) impregnating a noble metal into ceria supported on the hydrothermal-treated γ-alumina;
b) calcining the resultant of step a); and
c) reducing the resultant of step b).

In an embodiment of the present invention, in the step a) impregnating of the noble metal, the noble metal is at least one selected from rhodium, palladium and platinum.

In another embodiment of the present invention, in the step a) impregnating of the noble metal, the noble metal is platinum. In another embodiment of the present invention, in the step a) impregnating of the noble metal, the noble metal is rhodium. In still another embodiment of the present invention, in the step a) impregnating of the noble metal, the noble metal is palladium.

In an embodiment of the present invention, a weight of the noble metal based on the total weight of the catalyst is about 0.1 wt % to about 1.0 wt %. In a specific embodiment of the present invention, the weight of the noble metal based on the total weight of the catalyst is about 0.5 wt %.

In an embodiment of the present invention, the step of b) calcining is performed under air at about 400° C. to about 600° C., and/or the step c) reducing is performed under hydrogen ($H_2$) at about 400° C. to about 600° C.

In a specific embodiment of the present invention, the b) calcining is performed under air of about 400° C. to about 600° C., about 400° C. to about 550° C., about 400° C. to about 500° C., about 400° C. to about 450° C., about 450° C. to about 600° C., about 450° C. to about 550° C., about 450° C. to about 500° C., about 500° C. to about 600° C., about 500° C. to about 550° C., or about 550° C. to about 600° C.

In a specific embodiment of the present invention, the c) reducing is performed under hydrogen ($H_2$) of about 400° C. to about 600° C., about 400° C. to about 550° C., about 400° C. to about 500° C., about 400° C. to about 450° C., about 450° C. to about 600° C., about 450° C. to about 550° C., about 450° C. to about 500° C., about 500° C. to about 600° C., about 500° C. to about 550° C., or about 550° C. to about 600° C.

In another embodiment of the present invention, the step c) reducing is performed under a hydrogen ($H_2$)/nitrogen ($N_2$) flow. In still another embodiment of the present invention, the step c) reducing is performed under a 5% (v/v) hydrogen ($H_2$)/nitrogen ($N_2$) flow.

In a specific embodiment of the present invention, the step c) reducing is performed for about 30 minutes to about 2 hours.

In another specific embodiment of the present invention, the step c) reducing is performed for about 30 minutes to about 2 hours, about 30 minutes to about 1 hour 30 minutes, about 30 minutes to about 1 hour, about 1 hour to about 2 hours, about 1 hour to about 1 hour 30 minutes, or about 1 hour 30 minutes to about 2 hours.

In another specific embodiment of the present invention, the step c) reducing is performed at about 500° C. for about 1 hour under a 5% (v/v) hydrogen ($H_2$)/nitrogen ($N_2$) flow.

Hereinafter, each step according to an embodiment of the method for improving resistance to sulfur-poisoning of a noble metal catalyst of the present invention will be described in detail.

1) Performing Hydrothermal Treatment of Ceria Supported on γ-Alumina.

This step 1) is a step of hydrothermal treatment on ceria supported on γ-alumina. This step 1) may additionally include 1-1) forming and activating $Al^{3+}$ penta sites in γ-alumina, 1-2) impregnating the activated γ-alumina in a ceria precursor solution, and 1-3) calcining the impregnation resultant.

1-1) Forming an $Al^{3+}$ Penta Site on γ-Alumina.

The step 1-1) is a step of activating γ-alumina to form an unsaturated $Al^{3+}$ penta site. The γ-alumina is commercially available. The γ-alumina is activated under a flow of hydrogen ($H_2$) between about 200° C. to about 500° C. Specifically, γ-alumina is activated under a 10% $H_2/N_2$ flow at about 350° C. More specifically, γ-alumina is activated at about 350° C. under a 10% $H_2/N_2$ flow for 1 hour. Through the activation, γ-alumina in which $Al^{3+}$ penta sites are formed may be obtained. In the present invention, "$rAl_2O_3$" means activated γ-alumina. The activated γ-alumina may be in powder form.

1-2) Impregnating the Activated γ-Alumina in a Ceria Precursor Solution.

The step 1-2) is a step of impregnating the activated γ-alumina resultant from step 1-1) in the ceria precursor solution. The activated γ-alumina powder is impregnated with an aqueous solution of $Ce(NO_3)_3 \cdot 6H_2O$, a ceria precursor solution. It is apparent to those skilled in the art that other ceria precursor solutions described above may be used. Due to the impregnation, nano-sized ceria is formed on the $Al^{3+}$ penta site formed in the step 1-1). A loading content of cerium in the impregnation resultant solution is about 20 wt %.

The resultant solution is stirred at room temperature for about 1 hour. After stirring, the solution is heated to completely evaporate the water. As a result, a powder is formed.

1-3) Calcining the Impregnation Resultant.

The step 1-3) is a step of calcining the powder, which is the impregnation resultant of step 1-2). The calcining is performed by drying the resulting powder in an oven at about 80° C. overnight, and then reacting it in static air at about 500° C. for about 5 hours without applying a flow. The resultant was designated as $CeO_2/rAl_2O_3$.

It will be apparent to those skilled in the art that ceria supported on γ-alumina may be prepared by methods other than those of 1-1) to 1-3) described above.

This step is a step of hydrothermal treatment of ceria supported on γ-alumina prepared by the aforementioned methods 1-1) to 1-3) or other conventional methods known in the art.

As mentioned above, ceria supported on γ-alumina without hydrothermal treatment is referred to as $CeO_2/rAl_2O_3$. $CeO_2/rAl_2O_3$ may be prepared by the aforementioned methods 1-1) to 1-3) or other conventional methods known in the art.

The $CeO_2/rAl_2O_3$ is subjected to hydrothermal treatment by reacting it at about 500° C. to about 1000° C. for about 25 hours under a flow of 10% aqueous vapor (air used as a base gas). $CeO_2/rAl_2O_3$ subjected to hydrothermal treatment is denoted as $CeO_2/rAl_2O_3\_xHT$ when hydrothermal treatment (HT) is performed at x ° C., which is a ceria-alumina support ($CeO_2$—$Al_2O_3$ support) for improving sulfur tolerance of a noble metal catalyst according to an embodiment of the present invention ($CeO_2$—$Al_2O_3$ support). Herein x is a rational number from about 500° C. to about 100° C.

For example, in the case of n hydrothermal treatment at about 650° C., it is denoted as $CeO_2/rAl_2O_3\_650HT$; in the case of hydrothermal treatment at about 750° C., it is denoted as $CeO_2/rAl_2O_3\_750HT$; and in the case of hydrothermal treatment at 850° C., it is denoted as $CeO_2/rAl_2O_3\_850HT$, respectively, and each refer to the $CeO_2$—$Al_2O_3$ support of the present invention according to an embodiment, respectively. The support subjected to hydrothermal treatment is referred to as the $CeO_2$—$Al_2O_3$ support (ceria-alumina support) of embodiments of the present invention.

The $CeO_2$—$Al_2O_3$ support is structurally transformed from the hemispherical shape of nano-ceria on the surface to a shape of a polygonal bipyramid or truncated polygonal bipyramid, and specifically, an octahedral or a truncated octahedral shape by hydrothermal treatment. Due to the structural transformation of nano-ceria on the surface by the hydrothermal treatment, the resistance to sulfur-poisoning of the noble metal catalyst deposited on the ceria-alumina support is improved compared to the conventional noble metal catalyst deposited on the support that is not subjected to hydrothermal treatment.

After the hydrothermal treatment of the ceria supported on γ-alumina as described above, it may further include a) impregnating a noble metal into ceria supported on γ-alumina which is hydrothermally treated; b) calcining the resultant of step a); and c) reducing the resultant of step b).

a) Impregnating a Precious Metal.

The step a) is a step of impregnating a noble metal into $CeO_2/rAl_2O_3\_xHT$, that is, ceria-alumina support, hydrothermally treated at x ° C. (x is a rational number from about 500° C. to about 1000° C.) according to embodiments of the present invention. The impregnation may be wet-impregnation.

As used herein, the term "wet-impregnation" refers to a method widely used for preparing a heterogeneous catalyst including a process of separating solids using an excess of solvent, and drying and removing an excess of solvent. In embodiments of the present invention, a wet-impregnation method is used to support the noble metal on the ceria-alumina support.

At least one noble metal selected from palladium, rhodium, and platinum may be impregnated into $CeO_2/rAl_2O_3\_xHT$, which is the hydrothermal-treated ceria-alumina support of embodiments of the present invention.

The wet-impregnation method of depositing the noble metal on the hydrothermal-treated ceria-alumina support $CeO_2/rAl_2O_3\_xHT$ of embodiments of the present invention is as follows. The noble metal precursor solution is added to the $CeO_2/rAl_2O_3\_xHT$ support powder to form a slurry. The resulting slurry is stirred at 80° C. to completely evaporate the water. As a result, the noble metal is deposited on the $CeO_2$—$Al_2O_3$ support of embodiments of the present invention.

The noble metal precursor solution may be a rhodium precursor solution, a palladium precursor solution, and/or a platinum precursor solution.

Specifically, an aqueous solution containing a rhodium precursor solution is added to the $CeO_2/rAl_2O_3\_xHT$ support powder to form a slurry, the mixture is stirred at 80° C. to evaporate water completely, and rhodium is deposited on the $CeO_2$—$Al_2O_3$ support.

Specifically, an aqueous solution containing a palladium precursor solution is added to the $CeO_2/rAl_2O_3\_xHT$ support powder to form a slurry, the mixture is stirred at 80° C.

to evaporate water completely, and palladium is deposited on the $CeO_2$—$Al_2O_3$ support.

Specifically, an aqueous solution containing a platinum precursor solution is added to the $CeO_2/rAl_2O_3\_xHT$ support powder to form a slurry, the mixture is stirred at 80° C. to evaporate water completely, and platinum is deposited on the $CeO_2$—$Al_2O_3$ support.

b) Calcining the Resultant of Step a).

The step b) is a step of calcining the resultant after impregnation in step a). The calcining is performed by drying the resultant overnight at about 80° C. after the impregnation to obtain a dried powder, and calcining the dried powder under air at about 400° C. to about 600° C. Specifically, the powder is performed under air at about 500° C. for about 1 hour. As a result, a calcined powder is obtained.

c) Reducing the Resultant of Step b).

The step c) is a step of reducing the calcined powder of step b). The reducing is performed under hydrogen at about 400° C. to about 600° C. of the calcined powder. Specifically, the reducing is performed under hydrogen at about 500° C. for about 1 hour. More specifically, the reducing is performed in 5% hydrogen ($H_2$)/nitrogen ($N_2$) at about 500° C. for about 1 hour.

As a result, a noble metal catalyst for exhaust gas treatment with improved resistance to sulfur-poisoning according to embodiments of the present invention is obtained.

According to the type of the deposited noble metal and the hydrothermal treatment temperature, the noble metal catalyst for treating exhaust gas of embodiments of the present invention may be denoted as follows. It is denoted as $Rh/CeO_2/rAl_2O_3\_xHT$ when rhodium is deposited (x=about 500° C. to about 1000° C.), it is denoted as $Pd/CeO_2/rAl_2O_3\_xHT$ when palladium is deposited (x=about 500° C. to about 1000° C.), and it is denoted as $Pt/CeO_2/rAl_2O_3\_xHT$ when platinum is deposited (x=about 500° C. to about 1000° C.), respectively.

For example, when rhodium is deposited on a ceria-alumina support subjected to hydrothermal treatment at about 750° C., it is denoted as $Rh/CeO_2/rAl_2O_3\_750HT$, and when palladium is deposited on a ceria-alumina support subjected to hydrothermal treatment at about 750° C., it is denoted as $Pd/CeO_2/rAl_2O_3\_750HT$, and when platinum is deposited on a ceria-alumina support subjected to hydrothermal treatment at about 750° C., it is denoted as $Pt/CeO_2/rAl_2O_3\_750HT$.

When the method for improving resistance to sulfur-poisoning of the noble metal catalyst according to embodiments of the present invention is used, the nano-ceria structure on the surface of the ceria-alumina support is transformed from a hemispherical to an octahedral shape, and the surface sulfur species adsorption performance is lowered, compared with the conventional catalyst preparation method, resistance to sulfur-poisoning (sulfur tolerance) is improved, sintering resistance, long-term stability of the catalyst, and surface area are increased, and thereby the catalyst of embodiments of the present invention is suitable for mass production and may be usefully used for exhaust gas treatment, particularly carbon monoxide oxidation.

In a specific embodiment of the present invention, in the step a) impregnating the noble metal, a rhodium precursor solution, a palladium precursor solution, and/or a platinum precursor solution is added to the ceria-alumina support.

In one embodiment of the present invention, the rhodium precursor solution may be an $H_2RhCl_5$ aqueous solution. The rhodium precursor solution may be prepared by adding HCl to $RhCl_3$.

In another embodiment of the present invention, the rhodium precursor solution is at least one selected from $Rh(NO_3)_3 \cdot xH_2O$, $Rh_2(SO_4)_3$, $Rh_2(SO_4)_3 \cdot xH_2O$, $Rh(OAc)_3$, $Rh(OH)_3$, $RhCl_3$, $RhCl_3 \cdot xH_2O$, $(NH_4)_3RhCl_6$, $(H_2NCH_2CH_2NH_2)_3RhCl_3$, and $(H_2NCH_2CH_2NH_2)_3RhCl_3 \cdot 3H_2O$, but is not necessarily limited thereto.

The $Rh_2(SO_4)_3 \cdot xH_2O$ may include $Rh_2(SO_4)_3$—$H_2O$, $Rh_2(SO_4)_3 \cdot 2H_2O$, $Rh_2(SO_4)_3 \cdot 3H_2O$, $Rh_2(SO_4)_3 \cdot 4H_2O$, $Rh_2(SO_4)_3 \cdot 5H_2O$, $Rh_2(SO_4)_3 \cdot 6H_2O$, and an aqueous solution of rhodium (III) sulfate containing about 8% rhodium (III) sulfate, but is not necessarily limited thereto. More specifically, $Rh_2(SO_4)_3 \cdot xH_2O$ may be $Rh_2(SO_4)_3 \cdot 4H_2O$.

The $Rh(NO_3)_3 \cdot xH_2O$ may include $Rh(NO_3)_3$—$H_2O$, $Rh(NO_3)_3 \cdot 2H_2O$, $Rh(NO_3)_3 \cdot 3H_2O$, $Rh(NO_3)_3 \cdot 4H_2O$, $Rh(NO_3)_3 \cdot 5H_2O$, $Rh(NO_3)_3 \cdot 6H_2O$, and $Rh(NO_3)_3 \cdot xH_2O$ containing about 36% rhodium, but is not necessarily limited thereto.

In a specific embodiment of the present invention, the rhodium precursor solution of embodiments of the present invention is selected from $Rh(NO_3)_3 \cdot xH_2O$, $Rh_2(SO_4)_3$, $Rh_2(SO_4)_3 \cdot xH_2O$, $RhCl_3$, and $Rh(OAc)_3$, but is not necessarily limited thereto.

In a specific embodiment of the present invention, the palladium precursor solution may be an $H_2PdCl_4$ aqueous solution. The palladium precursor solution may be prepared by adding HCl to $PdCl_3$.

In another embodiment of the present invention, the palladium precursor solution is at least one selected from $H_2PdCl_4$, (1,3-bis(diphenylphosphino)propane)palladium (II) chloride, [(R)-(+)-2,2'-bis(diphenylphosphino)-1,1'-binaphthyl]palladium (II) chloride, [1,2,3,4-tetrakis(methoxycarbonyl)-1,3-butadiene-1,4-diyl]palladium (II), 1,1'-bis(diisopropylphosphino)ferrocene palladium dichloride, 1,1'-bis(di-tertbutylphosphino)ferrocene palladium dichloride, and 1,2-bis(phenylsulfinyl)ethane palladium (II) acetate, but is not necessarily limited thereto.

In an embodiment of the present invention, the platinum precursor solution may be an $H_2PtCl_6$ aqueous solution. The platinum precursor solution may be prepared by adding HCl to $PtCl_4$.

In another embodiment of the present invention, the platinum precursor solution is at least one selected from $H_2PtCl_6 \cdot 6H_2O$, $H_2PtCl_6$, $Pt(C_5H_7O_2)_2$, $K_2PtCl_4$, $H_2PtCl_4$, $Pt(CN)_2$, $PtCl_2$, $PtBr_2$, $K_2PtCl_6$, $Na_2PtCl_4 \cdot 6H_2O$, and $Na_2PtCl_6 \cdot 6H_2O$, but is not necessarily limited thereto.

The method for improving the resistance to sulfur-poisoning of the noble metal catalyst of embodiments of the present invention is a method of improving the resistance to sulfur-poisoning by preparing a noble metal catalyst for treating exhaust gas of embodiments of the present invention, which is another embodiment of the present invention and is deposited on the ceria-alumina support, which is another embodiment of the present invention, and thus overlapping descriptions are cited in order to avoid excessive complexity of the descriptions of the present specification, and the descriptions thereof are omitted.

The features and advantages of embodiments of the present invention are summarized as follows.

(a) Embodiments of the present invention provide a ceria-alumina support ($CeO_2$—$Al_2O_3$ support) including the nano-ceria in the shape of i) polygonal bipyramids or ii) truncated polygonal bipyramids supported on alumina.

(b) Embodiments of the present invention provide a noble metal catalyst for treating exhaust gas in which a noble metal is deposited on a ceria-alumina support of the present invention according to an embodiment.

(c) Embodiments of the present invention provide a method for improving resistance to sulfur-poisoning of a noble metal catalyst through structural transformation of nano-ceria supported on alumina.

(d) When the ceria-alumina support subjected to the hydrothermal treatment of embodiments of the present invention is used, compared to the conventional ceria-based catalyst, the sulfur tolerance, long-term stability, sintering resistance, and surface area of the noble metal catalyst are improved, so that it is suitable for practical use such as exhaust gas treatment, especially carbon monoxide oxidation reaction. In addition, in a relatively simple process compared to the conventional method for producing shaped particles, that is, through hydrothermal treatment, the structure of the surface nano-ceria is transformed into an octahedral shape while the catalyst has a high surface area, the catalyst has low sulfur species adsorption performance and is suitable for mass production, and a method for improving resistance to sulfur-poisoning of a noble metal catalyst is provided.

EXAMPLES

Throughout this specification, unless otherwise specified, in the case of "%" used to indicate the concentration of a specific substance, solids/solids is (weight/weight) %, % (w/w), or wt %, solids/liquids is (weight/volume) % or % (w/v), liquid/liquids is (volume/volume) % or % (v/v), and gas/gas is (volume/volume) %, or % (v/v).

Preparation Example 1: Synthesis of Ceria-Alumina Support for Improving Sulfur Tolerance of Noble Metal Catalyst According to Embodiments of the Present Invention 1.1: Preparation of $CeO_2$—$Al_2O_3$ Commercial γ-$Al_2O_3$ (99.97%, Alfa Aesar) was first activated at 350° C. in a 10% $H_2/N_2$ flow for 1 hour to generate an unsaturated $Al^{3+}$ penta site ($Al^{3+}_{penta}$ site). Activated γ-alumina was hereinafter referred to as "r$Al2O_3$."

Subsequently, the activated γ-$Al_2O_3$ powder was impregnated in a $Ce(NO_3)_3·6H_2O$ (99.99%, Kanto Chemical Co., Inc.) aqueous solution to form nano-sized $CeO_2$ species on $Al^{3+}_{penta}$ sites. A target loading content of Ce was 20 wt %. The solution was fervently stirred at room temperature for 1 hour. Subsequently, the solution was heated, until water was completely evaporated therefrom. As a result, powder therefrom was dried at 80° C. in an oven overnight to remove water remaining there and lastly calcined at 500° C. for 5 hours without applying a flow thereto in the air (static air). A resulting material therefrom was denoted as "$CeO_2$/r$Al_2O_3$," hereinafter.

1.2: Hydrothermal Treatment Method

The $CeO_2$/r$Al_2O_3$ was subjected to a hydrothermal treatment (HT) under a flow of 10% aqueous vapor (air as base gas, balanced air) for 25 hours at 750° C. The hydrothermal treatment was performed at various temperatures of 650° C. to 850° C., as a result, expressing a ceria-alumina support as "$CeO_2$/r$Al_2O_3$_xHT" (x=a rational number of 650° C. to 850° C.). For example, when the hydrothermal treatment was performed at 750° C., the ceria-alumina support was expressed as $CeO_2$/r$Al_2O_3$_750HT.

In embodiments of the present invention, "$CeO_2$/r$Al_2O_3$" or "as-made $CeO_2$/r$Al_2O_3$" denotes a support without hydrothermal treatment, a resultant of the aforementioned 1.1, and a "ceria-alumina support ($CeO_2$—$Al_2O_3$ support)", a "$CeO_2$—$Al_2O_3$ support," or "$CeO_2$/r$Al_2O_3$_xHT" (x=650 to 850) denotes a support with the aforementioned hydrothermal treatment of the 1.2.

For comparison, "$CeO_2$/r$Al_2O_3$" without hydrothermal treatment was used as a control.

Preparation Example 2: Synthesis of Noble Metal Catalyst for Exhaust Gas Treatment and Platinum Catalyst Deposited on Ceria-Alumina Support of Embodiments of the Present Invention Platinum (Pt) was deposited on the aforementioned ceria-alumina support of the 1.2 through wet impregnation. An aqueous solution including a desired amount of $H_2PtCl_6·6H_2O$ (≤100%, Sigma-Aldrich Co., Ltd.) was added to the support powder, and this slurry therefrom was continuously stirred at 80° C., until water was completely evaporated. After the impregnation, the sample was dried at 80° C. overnight, and the dried powder was calcinated in the air at 500° C. for 1 hour. Lastly, the calcined powder was reduced with 5% $H_2/N_2$ at 500° C. for 1 hour. A target loading content of Pt was 0.5 wt %. A resulting material therefrom, a catalyst of embodiments of the present invention was expressed as "Pt/$CeO_2$/r$Al_2O_3$_xHT" (x=a rational number of 650° C. to 850° C.) according to a hydrothermal treatment temperature of the support. For example, when the support was hydrothermally treated at 750° C., the catalyst of embodiments of the present invention, a platinum catalyst deposited on the $CeO_2$—$Al_2O_3$ support, was denoted as Pt/$CeO_2$/r$Al_2O_3$_750HT.

For comparison, a platinum catalyst deposited on the support without hydrothermal treatment was used as a control.

Figure 1:
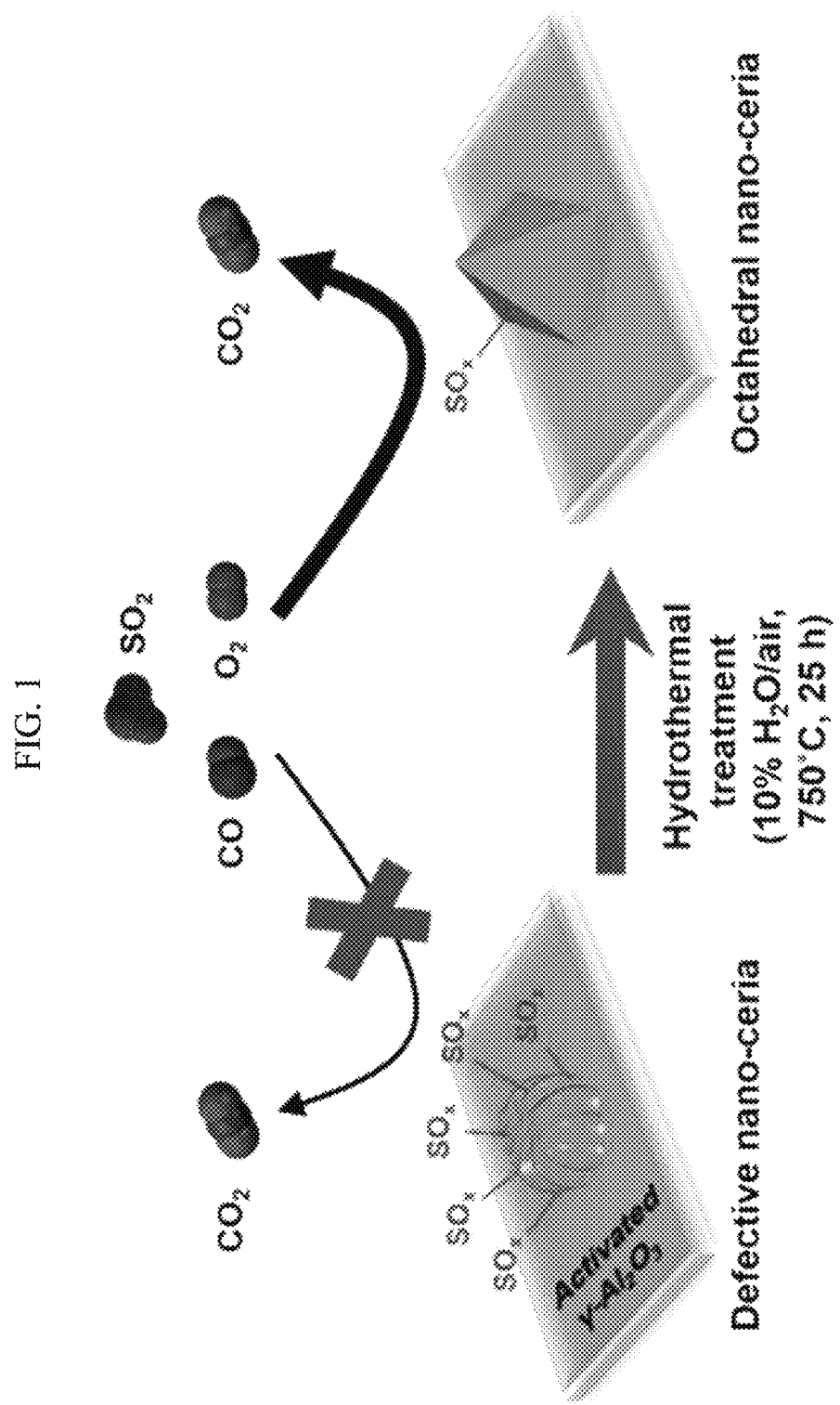
FIG. 1 shows a schematic view of changes before and after hydrothermal treatment in a nano-ceria catalyst supported on alumina according to an embodiment of the present invention.

FIG. 1 schematically shows property changes of the catalyst prepared by depositing platinum on the support of embodiments of the present invention due to the hydrothermal treatment. As shown in FIG. 1, when defective nano-ceria was hydrothermally treated at 750° C. in 10% $H_2O$/air for 25 hours, the nano-ceria was structurally transformed from a hemisphere to an octahedron, improving resistance to sulfur-poisoning before the hydrothermal treatment.

Example 1: Analysis Method of Catalyst Characteristics 1.1: Analysis Method of General Characteristics 1-1.1: Investigation Method of Structural Changes of Catalyst after Hydrothermal Treatment: TEM, HAADF-STEM, XRD, and $N_2$ Adsorption/Desorption Method The catalysts were examined with respect to structural changes through transmission electron microscopy (TEM, Tecnai G2 F30 S-Twin, FEI), high-angle annular dark field-scanning transmission electron microscopy (HAADF-STEM, Titan cubed G2 60-300, FEI), X-ray diffractometer (Cu Kα radiation, XRD, Rigaku Corp.), and $N_2$ adsorption/desorption isotherms at −196° C. (Tristar II 3020, Micromeritics Instrument Corp.).

1.1.2: Binding Energy and $Ce^{3+}$ Ratio Estimation Method

X-ray photoelectron spectroscopy (XPS) data were obtained by using a Kα XPS spectrometer (Thermo VG Scientific). Binding energy was corrected by using a C is peak favorable at 284.8 eV. Ce 3d XPS data consisted of two sets of spin-orbital multiplets contributing to Ce $3d_{3/2}$ and Ce $3d_{5/2}$ as follows: peaks labeled as u' (889.3 eV), u' (903.2 eV), $v_o$ (881.6 eV), and v' (884.9 eV) corresponded to $Ce^{3+}$, and peaks labeled as u (900.7 eV), u" (907.5 eV), u'" (916.7 eV), v (882.5 eV), v" (888.7 eV), and v'" (898.3 eV) corresponded to $Ce^{4+}$. In order to quantitatively estimate $Ce^{3+}$ in $CeO_2/rAl_2O_3$, integrated areas of the peaks corresponding to $Ce^{3+}$ ($u_o$, u', $v_o$, and v') and $Ce^{4+}$ (u, u", u'", v, v", and v'") were compared to estimate a ratio of $Ce^{3+}$ to a total content of Ce. Equation 3 was used.

$$Ce^{3+} = \frac{A_{u_0} + A_{u'} + A_{v_0} + A_{v'}}{A_u + A_{u''} + A_{u'''} + A_v + A_{v''} + A_{v'''} + A_{u_0} + A_{u'} + A_{v_0} + A_{v'}} \quad \text{Equation 3}$$

The $A_i$ is an integrated area of peak "i."

1.2: Desorption Method at Elevated Temperature

A temperature-programmed desorption (TPD) experiment using $CO_2$ or $SO_2$ was performed in a BELCAT-B (MicrotracBEL Corp.) equipped with a mass spectrometer (MS). The catalysts were pre-treated by flowing 50 sccm of 5% $O_2$/He at 400° C. for 1 hour and then cooled to room temperature. Subsequently, 10% $CO_2$/He or 1000 ppm $SO_2$/Ar gas was flowed through the catalysts at room temperature for 1 hour. Then, the catalysts were treated under a He flow at room temperature for 30 minutes. Lastly, the catalysts were heated under the He flow at 900° C. (10° C./min). $CO_2$ (m/z=44) and $SO_2$ (m/z=64) in the exhaust gases were analyzed by using an MS detector.

1.3: Diffuse Reflectance Infrared Fourier Transform Spectroscopy—Method for Identification of Carbonate and Sulfate Species The diffuse reflectance infrared Fourier transform spectroscopy (DRIFTS) was conducted as follows. In order to check carbonate and sulfate species, IR spectra of the samples were recorded on an FT-IR spectrometer (Nicolet iS50, Thermo Scientific). The catalysts were mixed with KBr powder in a weight ratio of 1:7 and then finely pulverized. The mixed powder was put in a sample cup and then placed inside a DRIFTS cell. The DRIFTS cell was preheated at 400° C. under a 5% $O_2$/Ar flow for 1 hour and then cooled to room temperature before switching to Ar purging. Subsequently, a feed gas with probe molecules ($CO_2$ or $SO_2$) was flowed at room temperature for 10 minutes, collecting DRIFT spectra in vacuum. The 5% $CO_2$/Ar and 100 ppm $SO_2$/Ar flows were respectively introduced for each $CO_2$ and $SO_2$ adsorption.

1.4: Pulsed CO Chemisorption Method—Method for Determination of Platinum Dispersibility Pt dispersion on the samples was determined by pulsed CO chemisorption which was modified from a method of Takeguchi et al. (Appl. Catal. A 2005, 293, 91-96; ACS Catal. 2017, 7, 7097-7105.) The Pt dispersion was used to estimate a size of Pt nanoparticles. First, each catalyst (30 mg) was heated under 5% $O_2$/He gas at 300° C. for 10 minutes and cooled to 50° C., and the samples were purged with He gas for 5 minutes. Subsequently, the samples were heated under a 5% $H_2$/Ar flow and heated at 200° C. Then, the samples were cooled to 50° C. and exposed to a gas flow: (i) He for 5 minutes; (ii) 5% $O_2$/He for 5 minutes; (iii) $CO_2$ for 10 minutes; (iv) He for 20 minutes; (v) 5% $H_2$/Ar for 5 minutes. In order to avoid overestimating the Pt dispersion, $CO_2$ was injected onto the ceria surface to form carbonate. Lastly, CO was pulsed every minute under a stream of He until the CO absorption was saturated onto the samples.

1.5: Catalyst Test Method—Evaluation of Sulfur Tolerance of Catalysts by Sulfation-Desulfation Test CO oxidation was conducted in a U-shaped quartz glass-fixed reactor under an atmospheric pressure. The reactor was filled with each catalyst (50 mg). The reactor was purged with 100 sccm of Ar gas for 1 hour at 100° C. and cooled to room temperature under an Ar flow. For the CO oxidation, a total of 100 sccm of 1% CO and 1% 02 as feed gas in the Ar base gas was introduced thereinto. The reactor was heated to a target reaction temperature at a ramping rate of 5° C./min and then maintained at the corresponding temperature for 18 minutes to reach a steady state. The produced gas was monitored through online gas chromatography equipped with a packed bed of Carboxen 1000 column (15 ft.×⅛ in.×2.1 mm, 75035, SUPELCO), a thermal conductivity detector (TCD), a capillary column (30 m×0.32 mm, GS-GASPRO, Agilent Technologies), and a flame ionization detector (FID). The catalysts were evaluated with respect to sulfur resistance by conducting a sulfation-desulfation test as follows: (step 1) 1% CO and 1% $O_2$ without $SO_2$ in the Ar base gas at 100° C.; (step 2) 20 ppm of $SO_2$ at 100° C. for 180 minutes; (step 3) at 100° C. for 90 minutes without $SO_2$; (step 4) 2% $H_2$/Ar and 0 ppm of $SO_2$ for 1 hour at 650° C.; and (step 5) standard CO oxidation at 100° C. under standard condition without $SO_2$.

Example 2: Analysis Results of Catalyst Characteristics

The present inventors have confirmed structural transformation of the surface of nano-ceria supported on $\gamma$-$Al_2O_3$ into a nano octahedron due to a hydrothermal treatment in the support prepared in the same manner as in Preparation Example 1 and an influence thereof on CO oxidation in the presence of $SO_2$ by examining changes in surface properties of the ceria and an influence thereof on a catalytic reaction in the method of Example 1.

As described in Preparation Example 2, briefly describing the method of manufacturing the catalyst of embodiments of the present invention, $\gamma$-$Al_2O_3$ was activated through reduction under a $H_2$ flow to form $Al^{3+}_{penta}$ sites. Highly defective nano-ceria was formed on the activated $\gamma$-$Al_2O_3$, and this material was expressed as '$CeO_2/rAl_2O_3$.' Subsequently, a hydrothermal treatment was conducted at various temperatures from 650° C. to 850° C. The hydrothermally treated material was denoted as '$CeO_2/rAl_2O_3$_xHT' (x=a hydrothermal temperature) below.

2.1: Result of Structural Examination of Support before Hydrothermal Treatment A structure of the nano-ceria supported on $\gamma$-$Al_2O_3$ and a state of the Ce oxidation were analyzed through high resolution-transmission electron microscopy (HR-TEM) and X-ray photoelectron spectroscopy (XPS). The results are shown in FIG. 2.

Figure 2:
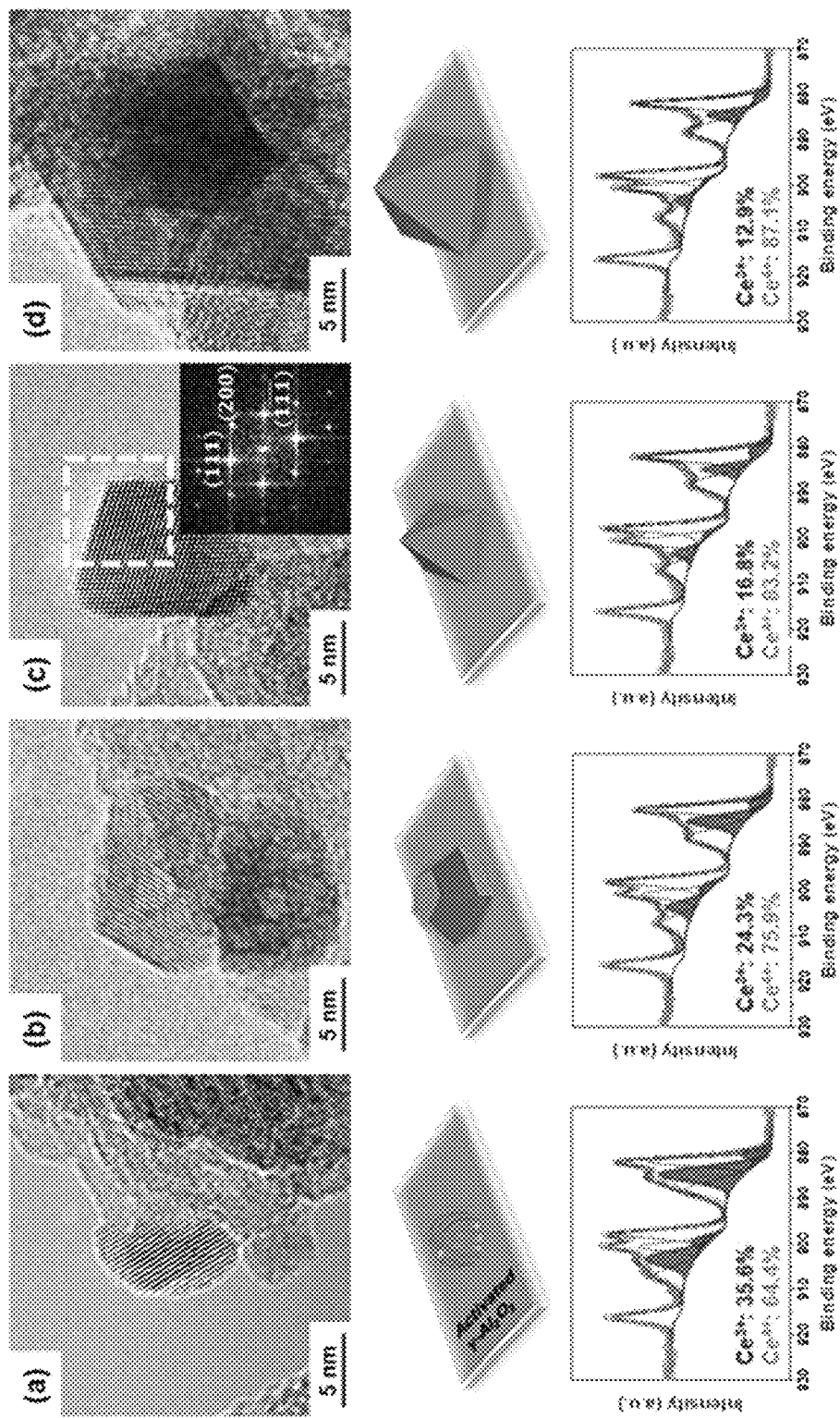
FIG. 2 shows the surface structural transformation of the $CeO_2/rAl_2O_3$ support through hydrothermal treatment.

As shown in (a) of FIG. 2, referring to HR-TEM images, as-made $CeO_2/rAl_2O_3$, that is, a support before hydrothermal treatment, exhibited hemispherical ceria nanoparticles with a size of <10 nm distributed on $\gamma$-$Al_2O_3$.

2.2: Estimation Result of Binding Energy and $Ce^{3+}$ Ratio

Fractions of $Ce^{3+}$ and $Ce^{4+}$ on the surface were also estimated in XPS. $Ce^{3+}$ indicates oxygen vacancy ($4Ce^{4+}$+$O^{2-}$→$2Ce^{4+}$+$2Ce^{3+}$+☐+$0.5O_2$; ☐ indicates the oxygen vacancy). As shown in the graph at the bottom of (a) of FIG. 2, the prepared $CeO_2/rAl_2O_3$ (a support before hydrothermal treatment) had a significantly high $Ce^{3+}$ fraction of 35.6%.

2.3: Result of investigation of Structural Changes of Support after Hydrothermal Treatment Surprisingly, when $CeO_2/rAl_2O_3$ was hydrothermally treated, a shape change of a nano-ceria domain was observed.

Compared with the as-made $CeO_2/rAl_2O_3$ without hydrothermal treatment in (a) of FIG. 2, HR-TEM images (top of FIG. 2) of $CeO_2/rAl_2O_3\_650HT$ with hydrothermal treatment at 650° C. in (b) of FIG. 2, $CeO_2/rAl_2O_3\_750HT$ with hydrothermal treatment at 750° C. in (c) of FIG. 2, and $CeO_2/rAl_2O_3\_850HT$ with hydrothermal treatment at 850° C. in (d) of FIG. 2 exhibited that the higher the hydrothermal treatment temperature, the sharper the octahedron the structure thereof was gradually changed into. This change was schematically shown in the central scheme of FIG. 2.

As shown in (b) of FIG. 2, the nano-ceria domain had a truncated shaped after the hydrothermal treatment at 650° C.

As shown in (c) of FIG. 2, after the hydrothermal treatment at 750° C. for 25 hours under a 10% $H_2O$/air flow, the hemispherical shape of the supported ceria particles was changed into a sharp octahedron with a diameter of 10 nm to 20 nm.

An inset figure located at the lower right of (c) of FIG. 2 shows a fast Fourier transform (FFT) pattern obtained from a white dotted line box. From the FFT pattern, a ceria phase (system) exposing a (111) facet was observed.

Figure 3:
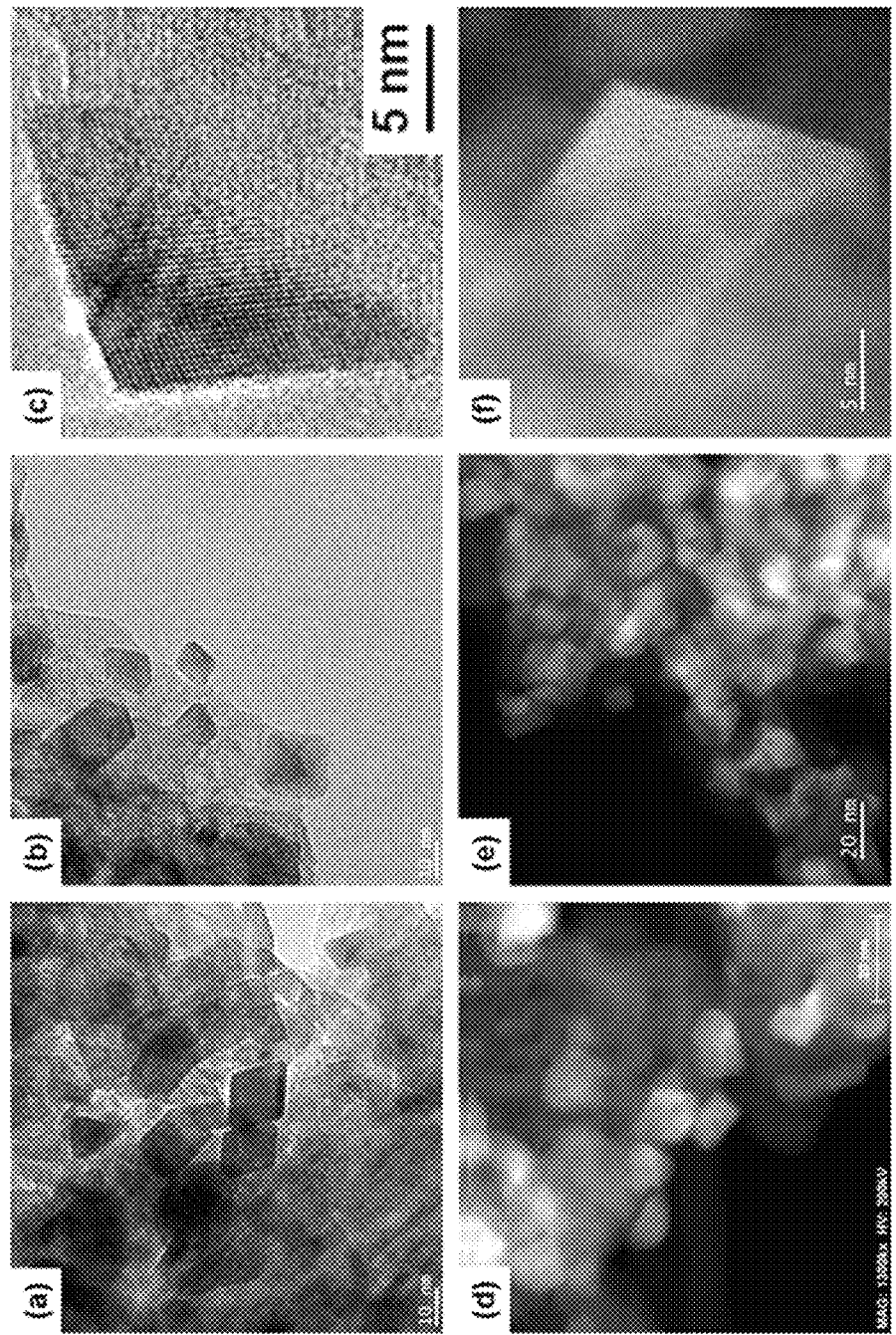
FIG. 3 is an additional HR-TEM image ((a) to (c)) and HAADF-STEM image ((d) to (f)) of the $CeO_2/rAl_2O_3\_750HT$ support obtained after hydrothermal treatment at 750° C. for 25 hours.

FIG. 3 shows additional HR-TEM images ((a) to (c) of FIG. 3) and HAADF-STEM images ((d) to (f) of FIG. 3) of the $CeO_2/rAl_2O_3\_750HT$ support obtained after the hydrothermal treatment at 750° C. for 25 hours. FIG. 3 also shows that the ceria particles on the surface of the support hydrothermally treated at 750° C. had an octahedral shape.

As shown in (d) of FIG. 2, octahedral cerias with a larger size of about 25 nm were generated at a higher temperature of 850° C.

Figure 4:
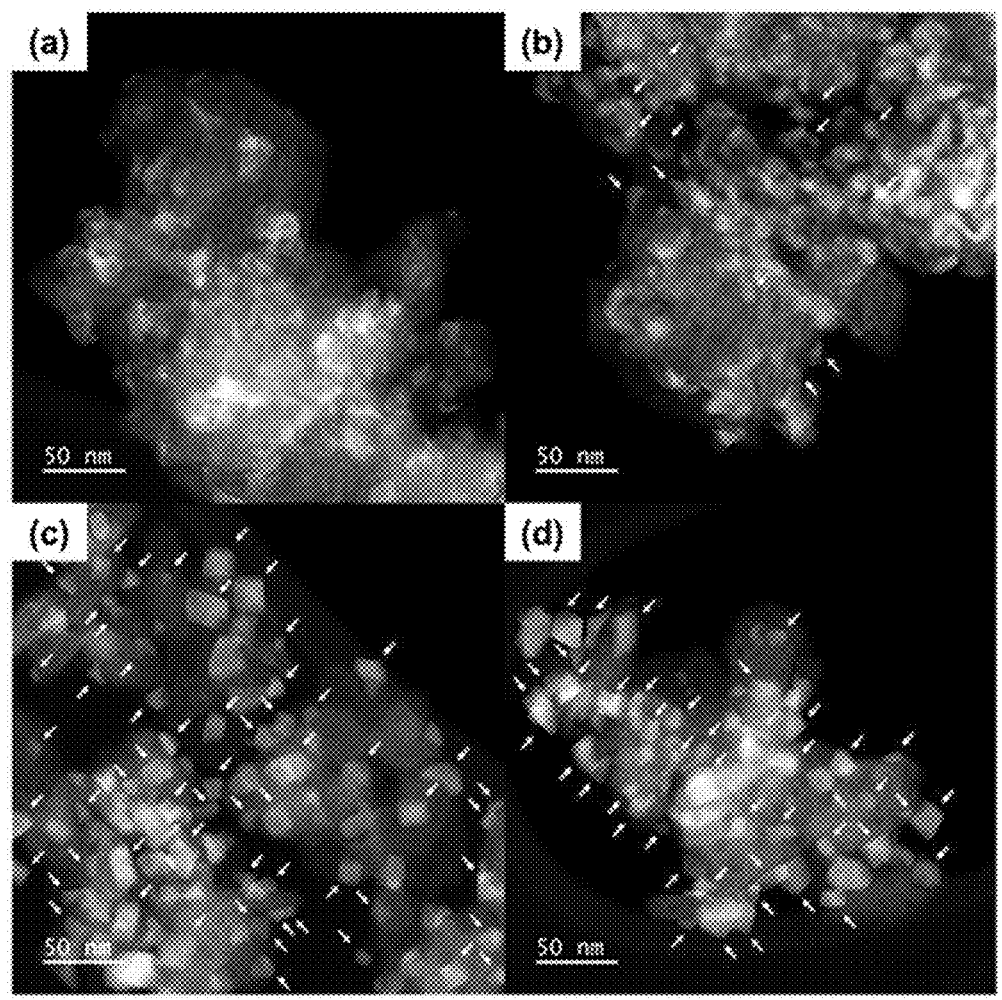
FIG. 4 shows HAADF-STEM images of (a) $CeO_2/rAl_2O_3$, (b) $CeO_2/rAl_2O_3\_650HT$, (c) $CeO_2/rAl_2O_3\_750HT$, and (d) $CeO_2/rAl_2O_3\_850HT$. Arrows indicate nano-cerias with an octahedral shape.

From a high-angle annular dark field scanning-transmission electron microscopic (HAADF-STEM) image of FIG. 4, a percentage of octahedral nano-ceria could be estimated. The arrows of FIG. 4 indicate nano-ceria with an octahedral shape. As shown in Table 1, $CeO_2/rAl_2O_3\_650HT$ had 14% of octahedrons, while $CeO_2/rAl_2O_3\_750HT$ and $CeO_2/rAl_2O_3\_850HT$ each had 71% and 85% of octahedrons.

TABLE 1

| Support | Total number of ceria particles | Number of octahedral shapes | Percent of octahedral shapes |
|---|---|---|---|
| $CeO_2/rAl_2O_3\_650HT$ | 94 | 13 | 14% |
| $CeO_2/rAl_2O_3\_750HT$ | 87 | 62 | 71% |
| $CeO_2/rAl_2O_3\_850HT$ | 53 | 45 | 85% |

2.4: Investigation Results of Changes in $Ce^{3+}$ Ratio Due to Hydrothermal Treatment Changes in a $Ce^{3+}$ fraction according to a hydrothermal treatment were estimated from XPS. At the bottom of FIG. 2, an XPS Ce 3d spectrum is shown.

Figure 5:
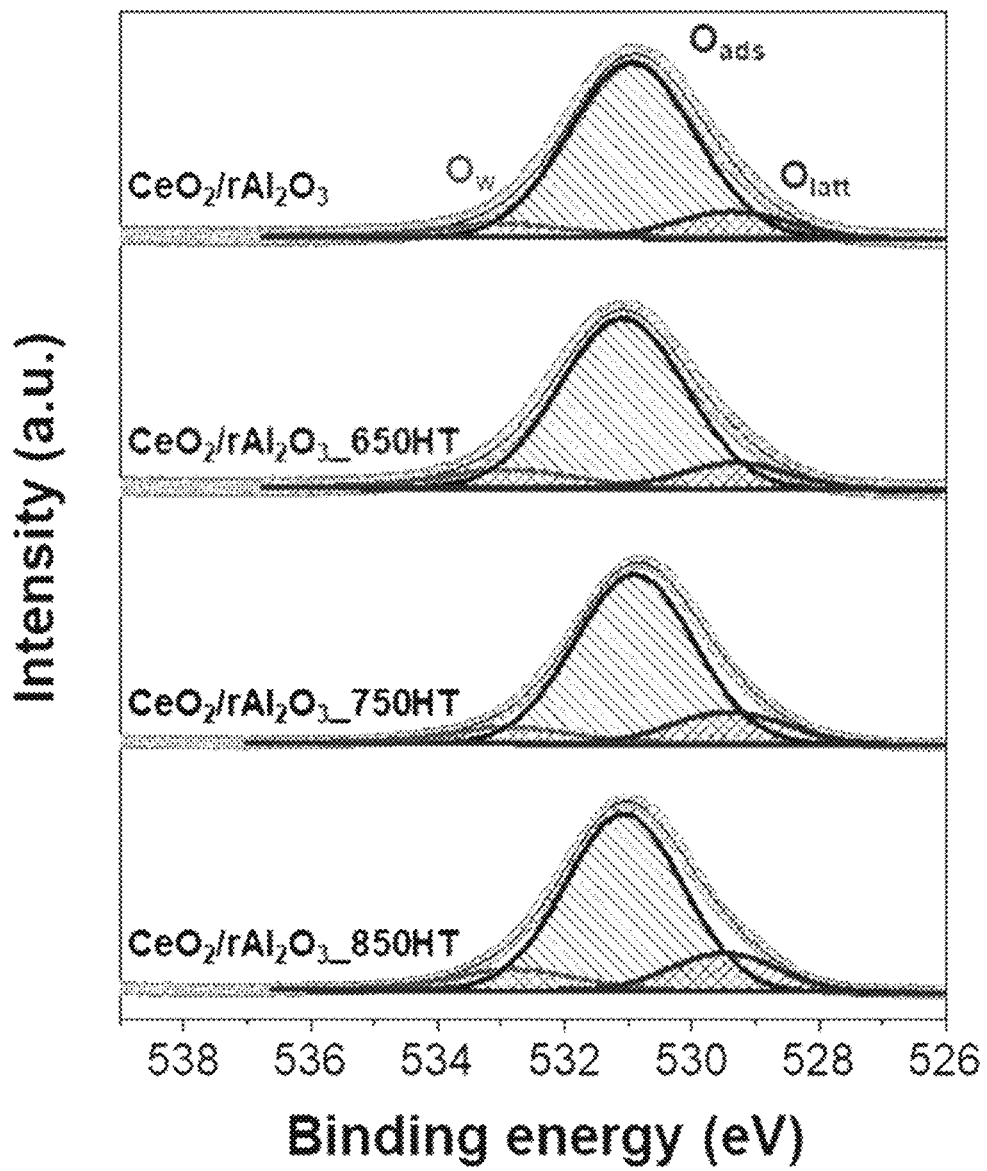
FIG. 5 shows the XPS O 1s spectrum of the $CeO_2/rAl_2O_3$ support.

As shown in bottom graphs of (a) to (d) of FIG. 2, in the support without hydrothermal treatment, the $Ce^{3+}$ fraction was 35.6%, but in the hydrothermally treated support, as a temperature increased to about 650° C., about 750° C., and about 850° C., each $Ce^{3+}$ fraction decreased to 24.3%, 16.8%, and 12.9%. The most stable $CeO_2$ (111) surface had a small fraction of $Ce^{3+}$ sites. FIG. 5 and Table 2 below also show an XPS 0 1s spectrum of the $CeO_2/rAl_2O_3$ support, which confirmed a decrease of surface oxygen species.

TABLE 2

| Catalyst | $O_{latt}$ (%)[a] | $O_{ads}$ (%)[b] | $O_w$ (%)[c] | $O_{ads}/O_{latt}$ |
|---|---|---|---|---|
| $CeO_2/rAl_2O_3$ | 11.4 | 80.1 | 8.5 | 7.0 |
| $CeO_2/rAl_2O_3\_650HT$ | 12.0 | 77.5 | 10.6 | 6.5 |
| $CeO_2/rAlO_3\_750HT$ | 14.0 | 76.1 | 10.0 | 5.5 |
| $CeO_2/rAl_2O_3\_850HT$ | 15.0 | 74.3 | 10.7 | 5.0 |

Figure 6:
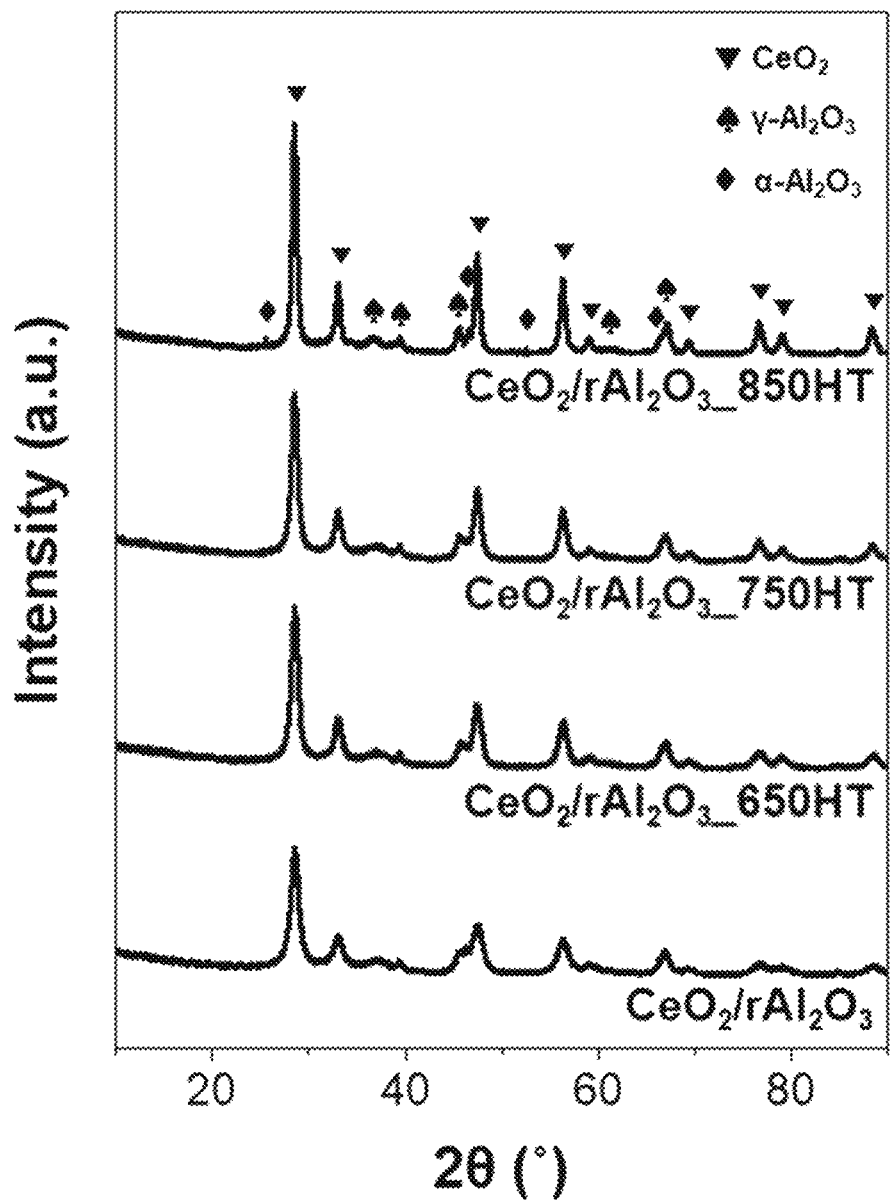
FIG. 6 shows XRD patterns of $CeO_2/rAl_2O_3$ and $CeO_2/rAl_2O_3\_xHT$ (x=650° C., 750° C., 850° C.) supports.

[a]Lattice oxygen.
[b]Surface-adsorbed oxygen.
[c]Surface hydroxyl species 2.5: Crystalline Properties of Support According to Hydrothermal Treatment Temperature—Domain Size and BET Surface Area As shown in FIG. 6, crystalline properties were confirmed by powder X-ray diffraction (XRD), and diffraction peaks were marked for standard $CeO_2$ fluorite (▼ of FIG. 6) and $\gamma$-$Al_2O_3$ (♦ of FIG. 6). The support without hydrothermal treatment exhibited a $CeO_2$ domain with a size of 9.2 nm, but a $CeO_2$ domain of the hydrothermally treated support was increased into 13.7 nm, 15.9 nm, and 23.8 nm, as the hydrothermal treatment temperature increased to about 650° C., about 750° C., and about 850° C. An alumina phase was slightly transformed at 850° C., so $\alpha$-$Al_2O_3$ (♦ of FIG. 6) was also observed.

A conventional catalyst had shaped particles mostly having a small surface area of about 10 $m^2$/g and were usually limited to practical use. However, the ceria-alumina support according to embodiments of the present invention could be usefully used due to a relatively higher surface area than that of the conventional catalyst despite the structural transformation of the surface nano-ceria.

As shown in Table 3, the prepared support ($CeO_2/rAl_2O_3$, not structurally transformed due to no hydrothermal treatment, that is, no shaped particles) also had a BET surface area of 63 $m^2$/g, and the support respectively hydrothermally treated at about 650° C., about 750° C., and about 850° C. had each BET surface area of 52 $m^2$/g, 48 $m^2$/g, and 30 $m^2$/g which were decreased therefrom. However, these surface areas were still high compared with about 10 $m^2$/g of that of the conventional shaped particles, which is agreed by a person of ordinary skill in the art.

TABLE 3

| Support | BET surface area ($m^2$/g) | $CO_2$ emission at maximum 700° C. TPD (μmol/g) | $CO_2$ emission at maximum 700° C. TPD (μmol/$m^2$) |
|---|---|---|---|
| $CeO_2/rAlO_3$ | 63 | 130.1 | 2.1 |
| $CeO_2/rAl_2O_3\_650HT$ | 52 | 88.6 | 1.7 |
| $CeO_2/rAl_2O_3\_750HT$ | 48 | 65.3 | 1.4 |
| $CeO_2/rAl_2O_3\_850HT$ | 30 | 30.1 | 1.0 |

As shown in FIG. 6, $CeO_2/rAl_2O_3$ without hydrothermal treatment at a $CeO_2$ (111) peak of 28.5° (2θ) (▼ of FIG. 6) was estimated to have a ceria domain size of 9.2 nm, but $CeO_2/rAl_2O_3\_650HT$, $CeO_2/rAl_2O_3\_750HT$ and $CeO_2/rAl_2O_3\_850HT$, which had a hydrothermal treatment, were respectively estimated to have a ceria domain size of 13.7 nm, 15.9 nm, and 23.8 nm.

Example 3: Comparison of the Characteristic Difference in Support According to Use of Intact Gamma-Alumina and Unsaturated Gamma-Alumina In addition, a support on which ceria was deposited on intact $\gamma$-$Al_2O_3$ support was denoted as "$CeO_2/Al_2O_3$" (refer to no gamma mark). In order to distinguish whether or not the hydrothermal treatment was conducted, $CeO_2/Al_2O_3$ without hydrothermal treatment was expressed as "manufactured $CeO_2/Al_2O_3$", and $CeO_2/Al_2O_3$ hydrothermally treated at 750° C. in the method of Preparation Example 1.2 was expressed as "$CeO_2/Al_2O_3\_750HT$."

Figure 7:
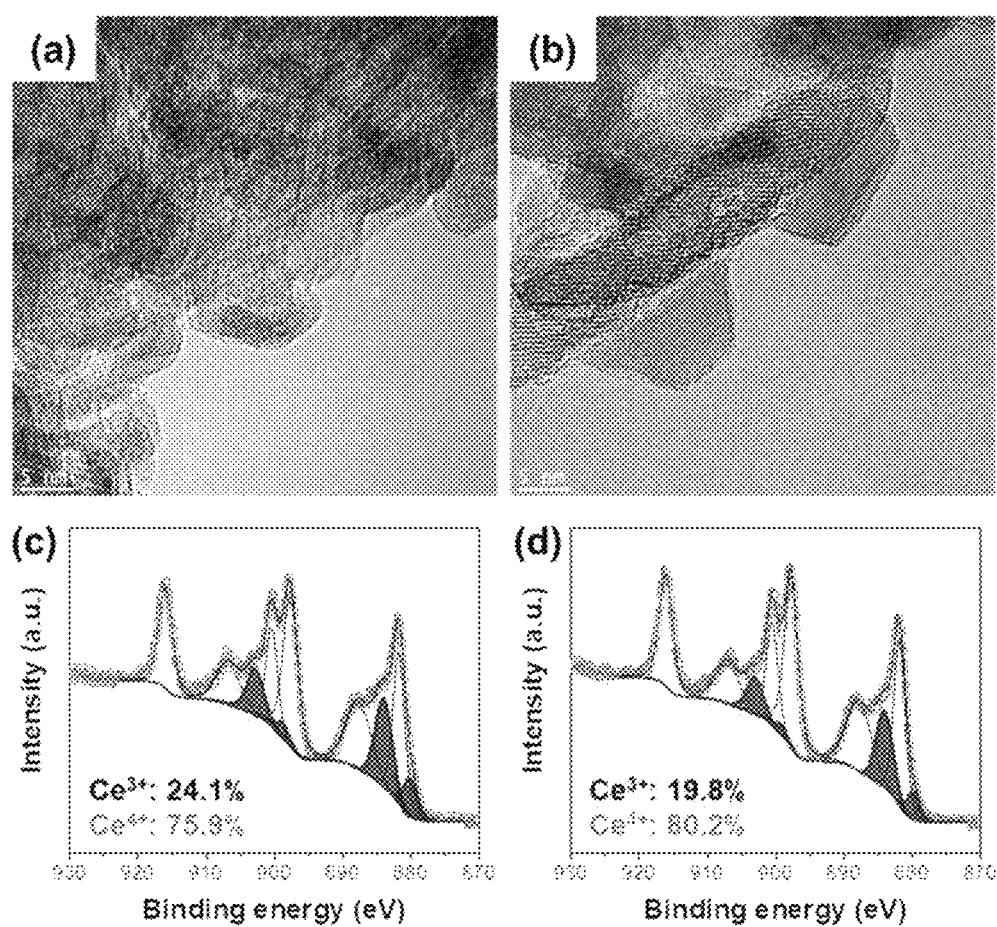
FIG. 7 shows HR-TEM images and XPS Ce 3d spectrums, in which (a) and (c) are an HR-TEM image and an XPS Ce 3d spectrum of as-made $CeO_2/rAl_2O_3$, and (b) and (d) are an HR-TEM image and XPS Ce 3d spectrum of $CeO_2/rAl_2O_3$ support after hydrothermal treatment at 750°

(a) and (c) of FIG. 7 are the results of an HR-TEM image and an XPS Ce 3d spectrum of "manufactured $CeO_2/Al_2O_3$", and (b) and (d) of FIG. 7 are the results of an HR-TEM image and an XPS Ce 3d spectrum of "$CeO_2/Al_2O_3\_750HT$."

As shown in (a) of FIG. 7, "the manufactured $CeO_2/Al_2O_3$" without hydrothermal treatment had a $Ce^{3+}$ fraction of 24.1%, but as shown in (b) of FIG. 7, the hydrothermally treated "$CeO_2/Al_2O_3\_750HT$" had a $Ce^{3+}$ fraction of 19.8%.

A decrease in the $Ce^{3+}$ fraction according to the hydrothermal treatment was much less when ceria was deposited on the intact $\gamma$-$Al_2O_3$ support, that is, in the support $CeO_2/Al_2O_3$.

Specifically, when the ceria was deposited on the intact $\gamma$-$Al_2O_3$ support, "the manufactured $CeO_2/Al_2O_3$" without hydrothermal treatment had a $Ce^{3+}$ fraction of 24.1%, and "$CeO_2/Al_2O_3\_750HT$" hydrothermally treated at 750° C. had a $Ce^{3+}$ fraction of 19.8%. When the intact $\gamma$-$Al_2O_3$ support was used, the decrease in the $Ce^{3+}$ fraction according to the hydrothermal treatment was 24.1%–19.8%=4.3%.

On the contrary, when ceria was deposited on a $\gamma$-$Al_2O_3$ support having an unsaturated $Al^{3+}_{penta}$ site, "the manufactured $CeO_2/rAl_2O_3$" without hydrothermal treatment had a $Ce^{3+}$ fraction of 35.6%, and "$CeO_2/rAl_2O_3\_750HT$" hydrothermally treated at 750° C. had a $Ce^{3+}$ fraction of 16.8%. When the $\gamma$-$Al_2O_3$ support having the $Al^{3+}_{penta}$ site was used, the decrease in the $Ce^{3+}$ fraction according to the hydrothermal treatment was 35.6%–16.8%=18.8%.

In addition, the decrease in the $Ce^{3+}$ fraction according to the hydrothermal treatment was 4.37 times larger in $CeO_2/Al_2O_3$ than in $CeO_2/rAl_2O_3$. Accordingly, ceria deposited on the $\gamma$-$Al_2O_3$ support having an $Al^{3+}_{penta}$ site according to embodiments of the present invention should be hydrothermally treated, so that sharp octahedral nano-ceria was significantly well formed by securing more oxygen vacancies due to a large decrease in the $Ce^{3+}$ fraction according to the hydrothermal treatment. In other words, activated $rAl_2O_3$, that is, $rAl_2O_3$ having the $Al^{3+}_{penta}$ site, should be used to effectively induce the octahedral structure transformation.

As shown in FIG. 8 and Table 4 below, $CeO_2/Al_2O_3$ and $CeO_2/rAl_2O_3$ were compared with respect to surface oxygen distribution by measuring temperature-programmed desorption (TPD). $CeO_2/Al_2O_3$ exhibited fewer surface oxygen species than $CeO_2/rAl_2O_3$.

As shown in FIG. 8, a desorption peak at 300° C. or less was formed by surface active oxygen (O) such as chemisorbed $O_2^-$ and $O^-$ species, but desorption peak at 300° C. to 500° C. and 500° C. or higher each corresponded to surface lattice oxygen (O) and bulk lattice oxygen (O). (Refer to Mol. Catal. 2019, 467, 9-15; and Appl. Catal. B 2013, 142-143, 677-683.)

Referring to the results, compared with the support $CeO_2/Al_2O_3$, in which ceria on an $\gamma$-$Al_2O_3$ support (intact $\gamma$-$Al_2O_3$ support), the support $CeO_2/rAl_2O_3$ prepared in the method of Preparation Example 1.1 according to embodiments of the present invention turned out to significantly increase participation of surface active oxygen.

TABLE 4

| Support | Surface oxygen (Surface active oxygen, surface lattice oxygen) (%) | Bulk lattice oxygen (%) |
|---|---|---|
| $CeO_2/rAl_2O_3$ | 67.7 | 32.3 |
| $CeO_2/Al_2O_3$ | 55.0 | 45.0 |

In addition, the octahedral shape was not found in the $CeO_2/Al_2O_3$, but instead, a truncated nano-ceria domain was observed. From these results, the highly defective ceria turned out to be essential to form the most stable $CeO_2$ (111) facet after the hydrothermal treatment.

Conventionally, Seal et al. (Engineering of nanoscale defect patterns in CeO2 nanorods via ex situ and in situ annealing, Nanoscale, 2015, 7, 5169) have reported that since the vacancies were agglomerated to form nanocavities with a stable surface, highly concentrated defects on a ceria rod were gradually transformed into cavities with an octahedral shape. In the system of embodiments of the present invention, a similar behavior was considered to occur. The defective ceria was able to eventually form a stable (111) surface according to hydrothermal annealing at a high temperature.

Example 4: Evaluation of Strength of Surface Base Site According to Hydrothermal Treatment 4.1: $CO_2$ Desorption Confirmation Result In general, surface lattice oxygen on metal oxide was regarded to act as a Lewis base site. This base site could react with gaseous $CO_2$ to form several carbonate species. In order to evaluate intensity of the surface base site, $CO_2$-TPD was measured through online quadrupole mass spectrometry (QMS). The results are shown in FIG. 9.

As shown in FIG. 9A, there were three major desorption peaks at about 90° C., 300° C., and 620° C. The peak at 620° C. was reduced particularly after the hydrothermal treatment and almost disappeared in the $CeO_2/rAl_2O_3\_750HT$ and $CeO_2/rAl_2O_3\_850HT$ supports.

An amount of desorbed $CO_2$, which was normalized according to mass or surface area, was listed in Table 3 above.

$CeO_2/rAl_2O_3$ without hydrothermal treatment had $CO_2$ desorption of 2.1 µmol/m², but the desorbed $CO_2$ was considerably reduced to 1.7 µmol/m² at 650° C., 1.4 µmol/m² at 750° C., and 1.0 µmol/m² at 850° C. after the hydrothermal treatment. Clearly, there were fewer and weaker base sites on the octahedral nano-ceria. This result is also consistent with recent studies showing that $CO_2$ was weakly bound on the $CeO_2$ (111) surface but more strongly on the $CeO_2$ (100) surface.

4.2: Confirmation Result of Formation of Surface Carbonate Species

Formation of carbonate on the surface was examined through diffuse reflectance infrared Fourier transform spectroscopy (DRIFTS), and the result is shown in FIG. 9B.

FIG. 9B shows an IR spectrum after $CO_2$ adsorption at room temperature. IR peaks of 1546 cm$^{-1}$, 1337 cm$^{-1}$, and 1045 cm$^{-1}$ could be assigned to bidentate carbonates, a peak of monodentate carbonate was observed at 1546 cm$^{-1}$, 1391 cm$^{-1}$, and 1045 cm$^{-1}$, and a peak of bridged carbonate was observed at 1685 cm$^{-1}$, 1430 cm$^{-1}$, 1360 cm$^{-1}$, and 1045 cm$^{-1}$.

Intensity of these IR peaks was reduced after the hydrothermal treatment. In particular, $CeO_2/rAl_2O_3\_750HT$ exhibited a clear peak at 1337 cm$^{-1}$. Wu et al. have reported that these clear IR peaks were observed on ceria octahedron with (111) facet but rarely observed on a rod with (110) facet or a cube with a (100) facet. (Wu, Z. et al., Spectroscopic Investigation of Surface-Dependent Acid-Base Property of Ceria Nanoshapes. J. Phys. Chem. C 2015, 119 13, 7340-7350.)

Example 5: Carbon Monoxide Oxidation Reaction Using Catalyst of Embodiments of the Present Invention 5.1 Light-Off Curve for Carbon Monoxide Oxidation Platinum (Pt) was loaded onto a $CeO_2/rAl_2O_3$ or $CeO_2/rAl_2O_3\_xHT$ (x=650, 750, 850) support and then used as a catalyst for CO oxidation. Among the aforementioned catalysts, $Pt/CeO_2/rAl_2O_3\_xHT$ was a catalyst of embodiments of the present invention prepared in the method of Preparation Example 2. In addition, the synthesized $Pt/CeO_2$ catalyst was compared with a commercial $CeO_2$ support as a control. 1% CO and 1% $O_2$ (Ar base gas) was flowed to each catalyst. FIG. 10 shows a graph showing changes of a carbon monoxide conversion rate (CO conversion %) according to a temperature, that is, a light-off curve for CO oxidation.

As shown in FIG. 10, a $Pt/CeO_2/rAl_2O_3$ catalyst without hydrothermal treatment (● of FIG. 10), $Pt/CeO_2/rAl_2O_3\_750HT$ hydrothermally treated at 750° C., a catalyst of embodiments of the present invention, (♦ of FIG. 10) exhibited a similar light-off temperature, but $Pt/CeO_2/rAl_2O_3\_850HT$ hydrothermally treated at 850° C., a catalyst of embodiments of the present invention, (▼ of FIG. 10) exhibited a significantly increased light-off temperature.

5.2 Carbon Monoxide Conversion Rate Change According to $SO_2$ Flow Comparison Results CO oxidation was monitored at 100° C. under a flow of $SO_2$, and the results are shown in FIG. 11. FIG. 11 shows a carbon monoxide conversion rate depending on time, which was measured and calculated through the following sequential steps: (step 1) under a condition of 1% CO and 1% $O_2$ in Ar base gas without $SO_2$ at 100° C.; (step 2) under a condition of 20 ppm of $SO_2$ at 100° C. for 180 minutes; (step 3) under a condition of no $SO_2$ at 100° C. for 90 minutes; (step 4) under a condition of 2% $H_2$ and 0 ppm of $SO_2$ at 650° C. for 60 minutes; and (step 5) standard CO oxidation under a standard condition without $SO_2$ at 100° C.

As a result, the CO conversion rate was initially about 90% or higher under the absence of $SO_2$. However, when 20 ppm of $SO_2$ was added thereto, the CO conversion rate was significantly reduced. When $SO_2$ was flowed for 180 minutes, the CO conversion rate of $Pt/CeO_2$ (■ of FIG. 11) decreased from 91% to 0%, the CO conversion rate of $Pt/CeO_2/rAl_2O_3$ (● of FIG. 11) decreased from 96% to 12%, and the CO conversion rate of $Pt/CeO_2/rAl_2O_3\_750HT$ (♦ of FIG. 11) decreased from 89% to 35%. The $Pt/CeO_2/rAl_2O_3\_750HT$ catalyst with an octahedron ceria support, that is, the catalyst of embodiments of the present invention (♦ of FIG. 11) exhibited the smallest deactivation.

Subsequently, when the $SO_2$ flow stopped, the CO conversion in all catalysts was not recovered to the original CO conversion rate but maintained. Diesel oxidizing catalysts or reduction catalysts of many automotive catalysts such as NOx storage were treated under fuel-rich conditions at a high temperature and regenerated from sulfur-poisoning. The $SO_2$-poisoned catalyst was regenerated for 60 minutes at 650° C. under a flow of 2% $H_2$/Ar as follows. The CO conversion rate of $Pt/CeO_2$ (■ of FIG. 11) increased again to 22%, the CO conversion rate of $Pt/CeO_2/rAl_2O_3$ (♦ of FIG. 11) increased again to 42%, and the CO conversion rate of $Pt/CeO_2/rAl_2O_3\_750HT$ (♦ of FIG. 11) increased again to 85%. While other catalysts were unable to restore original activity for CO oxidation, the catalyst of embodiments of the present invention, $Pt/CeO_2/rAl_2O_3\_750HT$ (♦ of FIG. 11), almost completely recovered to the original initial activity for the CO oxidation.

Example 6: Comparison of Resistance to Sulfur-Poisoning by Catalyst 6.1 Comparison Results of Specific Rate, Sulfur-Poisoning Resilience and Surface Sulfur Species FIG. 12 shows a specific rate as a function of time (minutes) normalized to a surface area. The catalyst of embodiments of the present invention, $Pt/CeO_2/rAl_2O_3\_750HT$ (♦ of FIG. 12), still exhibited the highest specific rate and the highest resilience to the sulfur-poisoning.

In addition, the present inventors have referred to the XPS results of FIG. 13 and proved that the catalyst of embodiments of the present invention having the hydrothermal treatment, $Pt/CeO_2/rAl_2O_3\_750HT$ (gray line), showed much fewer surface sulfur species, compared with $Pt/CeO_2/rAl_2O_3$ (black line) without hydrothermal treatment, and that residual sulfur therein was much removed by desulfation.

Specifically, $Pt/CeO_2/rAl_2O_3$ contained 3.29 at % (atomic weight %) of sulfur species during the sulfation and 2.26 at % of residual sulfur during the desulfation, while $Pt/CeO_2/rAl_2O_3\_750HT$ contained 1.41 at % of sulfur species during the sulfation and 0.35 at % of residual sulfur during the desulfation.

During the sulfation, compared with $Pt/CeO_2/rAl_2O_3$, $Pt/CeO_2/rAl_2O_3\_750HT$ of embodiments of the present invention exhibited fewer sulfur species by 0.88 at % (3.29 at %–1.41 at %), and during the desulfation, compared with $Pt/CeO_2/rAl_2O_3$, $Pt/CeO_2/rAl_2O_3\_750HT$ of embodiments of the present invention exhibited smaller residual sulfur by 1.91 at % (2.26 at %–0.35 at %).

From the results, the $Pt/CeO_2/rAl_2O_3\_750HT$ catalyst of embodiments of the present invention exhibited lower sulfur-poisoning resilience and fewer surface sulfur species than the conventional $Pt/CeO_2/rAl_2O_3$ without hydrothermal treatment during both the sulfation and the desulfation.

6.2 Analysis of Catalyst Characteristics of Comparative Catalyst Treated with Dry Air and Catalyst Treated with Hydrothermal Treatment of Embodiments of the Present Invention The catalyst of embodiments of the present invention was hydrothermally treated in the method of Preparation Example 1.2, wherein the hydrothermal treatment was performed under aqueous vapor. Compared with the catalyst of embodiments of the present invention, the $CeO_2/rAl_2O_3$ support was heat-treated at 750° C. without steam in the dry air, preparing a catalyst expressed as "$CeO_2/rAl_2O_3\_750T$" in FIG. 12 (◆ of FIG. 12).

As shown in FIG. 14A, an octahedral ceria was also observed in $CeO_2/rAl_2O_3\_750T$, but as shown in FIG. 14B, a $Ce^{3+}$ fraction was 22.6%, which was still quite high.

As shown in FIG. 11, when the $Pt/CeO_2/rAl_2O_3\_750T$ catalyst was used for CO oxidation, a CO conversion rate decreased from 91% to 25% under a flow of $SO_2$, but after the desulfation, the conversion rate increased again to 61% (◆ of FIG. 11). From the result, although ◆ this catalyst exhibited excellent resistance to sulfur-poisoning, unlike the steam-treated catalyst, that is, $Pt/CeO_2/rAl_2O_3\_750HT$, the catalyst of embodiments of the present invention (♦ of FIG. 11), activity of the Pt/CeO$_2$/rAl$_2$O$_3$_750T catalyst was not easily recovered.

6.3 Comparison of Adsorption of Sulfur Species by Catalyst

SO$_2$-TPD was performed to measure affinity of SO$_2$ for the CeO$_2$/rAl$_2$O$_3$ support and the Pt/CeO$_2$/rAl$_2$O$_3$ catalyst, and the results are shown in FIG. 15. FIGS. 15A and 15B show SO$_2$ emission after exposure to 1000 ppm of SO$_2$/Ar, and Table 5 below shows an amount of desorbed SO$_2$.

TABLE 5

| Support | BET surface area (m$^2$/g) | SO$_2$ emission at maximum 900° C. TPD (μmol/g) | SO$_2$ emission at maximum 900° C. TPD (μmol/m$^2$) |
|---|---|---|---|
| CeO$_2$ | 53 | 295.2 | 5.6 |
| CeO$_2$/rAl$_2$O$_3$ | 63 | 170.8 | 2.7 |
| CeO$_2$/rAl$_2$O$_3$_750T | 50 | 67.8 | 1.4 |
| CeO$_2$/rAl$_2$O$_3$_750HT | 48 | 53.8 | 1.1 |
| Pt/CeO$_2$ | 51 | 305.3 | 6.0 |
| Pt/CeO$_2$/rAl$_2$O$_3$ | 60 | 183.1 | 3.0 |
| Pt/CeO$_2$/rAl$_2$O$_3$_750T | 47 | 66.7 | 1.4 |
| Pt/CeO$_2$/rAl$_2$O$_3$_750HT | 45 | 53.2 | 1.2 |

As shown in FIG. 15A, a peak at a low temperature (<200° C.) indicates desorption of molecular SO$_2$, which was weakly adsorbed on the surface. A peak at 200° C. to 600° C. relates to desorption of cerium sulfate formed on the surface, but a peak at greater than 600° C. indicates cerium sulfate with a bulk phase.

As shown in FIG. 15B, when Pt was loaded on each support, cerium sulfate was more easily formed by SO$_2$ outflow from Pt to the adjacent ceria site, which shifted the peak to a higher temperature.

As shown in Table 5, in Pt/CeO$_2$, an amount of desorbed SO$_2$ was 6.0 μmol/m$^2$, and in Pt/CeO$_2$/rAl$_2$O$_3$, an amount of desorbed SO$_2$ was 3.0 μmol/m$^2$, but in Pt/CeO$_2$/rAl$_2$O$_3$_750T, an amount of desorbed SO$_2$ was 1.4 μmol/m$^2$, and in Pt/CeO$_2$/rAl$_2$O$_3$_750HT, an amount of desorbed SO$_2$ was 1.2 μmol/m$^2$, which significantly decreased therefrom.

From the results, the present inventors confirmed that octahedral nano-ceria with a few defect sites clearly suppressed adsorption of sulfur species.

6.4 Comparison of Surface Sulfate Species

FIG. 16 shows a DRIFT spectrum obtained during adsorption of SO$_2$ on a Pt-loaded catalyst at room temperature. An IR spectrum of the Pt/CeO$_2$ catalyst exhibited specific peaks of surface sulfate species at 1244 cm$^{-1}$, 1128 cm$^{-1}$, 903 cm$^{-1}$, and 791 cm$^{-1}$. IR bands at 1026 cm$^{-1}$ and 992 cm$^{-1}$ indicate surface sulfurous species. Intensity of these IR peaks significantly decreased in the Pt/CeO$_2$/rAl$_2$O$_3$ catalyst.

In particular, the catalyst of embodiments of the present invention, the Pt/CeO$_2$/rAl$_2$O$_3$_750HT catalyst, had a sulfite IR band alone, which was confirmed in FIG. 16. Conventionally, SO$_2$ adsorption on the ceria octahedron phase has been reported to mostly form sulfite species. As shown in Table 6 and FIG. 17, referring to CO chemisorption and HAADF-STEM images, since all the samples had a similar Pt particle size, the effect of Pt nanoparticles was excluded. The Pt nanoparticles were mainly located in the CeO$_2$ domain.

TABLE 6

| Catalyst | Pt dispersion (%) | Pt particle size (nm) |
|---|---|---|
| Pt/CeO$_2$/rAl$_2$O$_3$ | 79.2 | 1.4 |
| Pt/CeO$_2$/rAl$_2$O$_3$_750HT | 76.3 | 1.5 |
| Pt/CeO$_2$/rAl$_2$O$_3$_750T | 75.0 | 1.5 |
| Pt/CeO$_2$ | 76.8 | 1.5 |

Example 7: Long-Term Stability of Catalyst

The Pt/CeO$_2$/rAl$_2$O$_3$_750HT catalyst of embodiments of the present invention was tested with respect to long-term stability at 100° C. by repeating sulfation-desulfation cycles, while running CO oxidation, and the results are shown in FIG. 18. As shown in FIG. 18, the Pt/CeO$_2$/rAl$_2$O$_3$_750HT catalyst of embodiments of the present invention maintained a high CO conversion rate without deactivation during four sulfation-desulfation cycles.

In the long-term stability test, in order to check whether or not the octahedral shape of nano-ceria of the catalyst was maintained, HAADF-STEM images were obtained, and the results are shown in an inset figure of FIG. 18 and in FIG. 19. As shown in the inset of FIG. 18 and in FIG. 19, referring to the HAADF-STEM images, the octahedral shape of the nano-ceria for the Pt/CeO$_2$/rAl$_2$O$_3$_750HT catalyst of embodiments of the present invention was well preserved after the 4th desulfation step at 650° C.

As shown in FIG. 20 and Table 7 below, the CO-DRIFTS and CO chemisorption results also exhibited that Pt nanoparticles of the Pt/CeO$_2$/rAl$_2$O$_3$_750HT catalyst of embodiments of the present invention were not almost changed even after this stability test.

TABLE 7

| Pt/CeO$_2$/rAl$_2$O$_3$_750HT | Pt dispersion (%) | Pt particle size (nm) |
|---|---|---|
| As-made | 76.3 | 1.5 |
| After 4th cycle | 70.2 | 1.6 |

From the results, the present inventors have confirmed that the Pt/CeO$_2$/rAl$_2$O$_3$_750HT catalyst of embodiments of the present invention preserved the octahedral shape after the 4th sulfation-desulfation cycle and exhibited long-term stability, thereby excellent resistance to sulfur-poisoning and excellent resilience.

CONCLUSION

In embodiments of the present invention, a platinum (Pt) catalyst deposited on a CeO$_2$—Al$_2$O$_3$ support was synthesized in the form of octahedral nano-ceria in the method described in Preparation Examples 1 and 2. After fixing the supported nano-ceria with high defects in γ-Al$_2$O$_3$ pre-activated to have an Al$^{3+}_{penta}$ site, a CeO$_2$—Al$_2$O$_3$ support was formed (Preparation Example 1.1). The CeO$_2$—Al$_2$O$_3$ support was hydrothermally treated at 750° C. for 25 hours (Preparation Example 1.2).

The hydrothermal treatment changed a structure of the CeO$_2$—Al$_2$O$_3$ support to form a stabilized octahedral shape having a CeO$_2$ (111) facet and a minimal amount of Ce$^{3+}$ (Example 2). Surface oxygen defects and basicity were controlled by various hydrothermal treatment temperatures (Examples 2 and 3).

Subsequently, the catalyst of embodiments of the present invention, a Pt-loaded catalyst deposited with Pt on a support, was used for CO oxidation under the presence of $SO_2$ (Example 5). The catalyst of embodiments of the present invention, that is, the catalyst having octahedron nano-ceria exhibited excellent resistance to sulfur-poisoning during the sulfation and excellent resilience after the desulfation and particularly, the desulfation with 2% $H_2$ at 650° C. (Example 6). The formation of sulfate species was hampered due to the low basicity on the nano-ceria with a transformed structure. Initial activity for CO oxidation was completely recovered after the desulfation (Example 6). The octahedral shape was preserved after the 4th sulfation-desulfation cycle (Example 7). Embodiments of the invention provide insight into development of sulfur-resistant catalysts for a plurality of important environmental applications and useful guidance for increasing resistance to sulfur-poisoning in heterogeneous catalysts.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A ceria-alumina support ($CeO_2$—$Al_2O_3$ support) comprising:
   a nano-ceria having a shape of a polygonal bipyramid or a truncated polygonal bipyramid supported on alumina, wherein a weight of the ceria relative to a total weight of the ceria-alumina support is about 10 wt % to about 30 wt %.

2. The ceria-alumina support of claim 1, wherein:
   the polygonal bipyramid has a crystal facet in which (hkl) is (111) based on the (hkl) crystal facet defined by the Miller index or is a trigonal bipyramid or octahedron form; or
   the truncated polygonal bipyramid is a truncated form of a polygonal bipyramid having a crystal facet in which (hkl) is (111) or a truncated form of the trigonal bipyramid or octahedron.

3. The ceria-alumina support of claim 1, wherein the alumina comprises γ-alumina (gamma-phase alumina, γ-$Al_2O_3$, r$Al_2O_3$).

4. The ceria-alumina support of claim 1, wherein the alumina comprises an $Al^{3+}$ penta site ($Al^{3+}_{penta}$ site).

5. The ceria-alumina support of claim 1, wherein the ceria comprises defective ceria.

6. The ceria-alumina support of claim 1, wherein the nano-ceria having the shape of the polygonal bipyramid or the truncated polygonal bipyramid supported on the alumina has a diameter of about 10 nm to about 25 nm.

7. The ceria-alumina support of claim 1, wherein the ceria-alumina support has a BET surface area of about 30 $m^2/g$ to about 90 $m^2/g$.

8. A method for affecting resistance to sulfur-poisoning of a noble metal catalyst through structural transformation of nano-ceria supported alumina, the method comprising:
   preparing the ceria-alumina support of claim 1 by performing a hydrothermal treatment of the nano-ceria supported on γ-alumina.

9. The method of claim 8, wherein the structural transformation of the nano-ceria comprises the structural transformation of the nano-ceria into the nano-ceria having a shape of a polygonal bipyramid or a truncated polygonal bipyramid.

10. The method of claim 8, wherein the method further comprises forming an $Al^{3+}$ penta site in the γ-alumina before supporting the ceria on the γ-alumina.

11. The method of claim 10, wherein forming the $Al^{3+}$ penta site in the γ-alumina is performed by activating the γ-alumina under a hydrogen ($H_2$) flow at about 200° C. to about 500° C.

12. The method of claim 8, wherein the ceria supported on the γ-alumina is formed by impregnating the γ-alumina in a ceria precursor solution.

13. The method of claim 8, wherein the method further comprises calcining the ceria supported on the γ-alumina under air at about 400° C. to about 600° C. before performing the hydrothermal treatment.

14. The method of claim 8, wherein the hydrothermal treatment is performed under an aqueous vapor flow of about 500° C. to about 1000° C.

15. The method of claim 8, wherein the method further comprises, after performing the hydrothermal treatment of the ceria supported on the γ-alumina:
   impregnating a noble metal into the ceria supported on the hydrothermal-treated γ-alumina to form a first resultant;
   calcining the first resultant to form a second resultant; and
   reducing the second resultant.

16. The method of claim 15, wherein the noble metal comprises rhodium, palladium or platinum.

17. The method of claim 15, wherein:
   calcining the first resultant is performed under air at about 400° C. to about 600° C.; or
   reducing the second resultant is performed under hydrogen ($H_2$) at about 400° C. to about 600° C.

18. A noble metal catalyst for treating exhaust gas, the noble metal catalyst comprising:
   a ceria-alumina support ($CeO_2$—$Al_2O_3$ support) comprising a nano-ceria having a shape of a polygonal bipyramid or a truncated polygonal bipyramid supported on alumina, wherein a weight of the ceria relative to a total weight of the ceria-alumina support is about 10 wt % to about 30 wt %; and
   a noble metal deposited on the ceria-alumina support.

19. The noble metal catalyst of claim 18, wherein the noble metal comprises rhodium, palladium, or platinum.

20. The noble metal catalyst of claim 18, wherein a weight of the noble metal with respect to a total weight of the noble metal catalyst is about 0.1 wt % to about 1.0 wt %.

21. The noble metal catalyst of claim 18, wherein the exhaust gas comprises hydrocarbon gas ($H_mC_n$), nitrogen oxide ($NO_x$), sulfur oxide ($SO_x$), or carbon monoxide (CO), and wherein m, n and x are rational numbers.

22. The noble metal catalyst of claim 18, wherein a treatment for treating the exhaust gas comprises a carbon monoxide oxidation reaction.

23. A ceria-alumina support ($CeO_2$—$Al_2O_3$ support) comprising:
   a nano-ceria having a shape of a polygonal bipyramid or a truncated polygonal bipyramid supported on alumina, wherein the nano-ceria having the shape of the polygonal bipyramid or the truncated polygonal bipyramid supported on the alumina has a diameter of about 10 nm to about 25 nm.

* * * * *